(12) United States Patent
Mattiussi et al.

(10) Patent No.: US 7,370,019 B2
(45) Date of Patent: May 6, 2008

(54) METHOD AND DEVICE FOR EVOLVING A NETWORK USING A GENETIC REPRESENTATION

(75) Inventors: Claudio Mattiussi, Ecublens (CH); Dario Floreano, St-Prex (CH)

(73) Assignee: Ecole Polytechnique Federal de Lausanne (CH)

( * ) Notice: Subject to any disclaimer, the term of this patent is extended or adjusted under 35 U.S.C. 154(b) by 23 days.

(21) Appl. No.: 11/159,405

(22) Filed: Jun. 23, 2005

(65) Prior Publication Data

US 2007/0011111 A1    Jan. 11, 2007

Related U.S. Application Data

(60) Provisional application No. 60/693,119, filed on Jun. 23, 2005.

(51) Int. Cl.
*G06N 3/12* (2006.01)
(52) U.S. Cl. .............................. 706/13; 706/12; 706/14; 706/46
(58) Field of Classification Search .................. 706/13, 706/12, 14, 46
See application file for complete search history.

(56) References Cited

U.S. PATENT DOCUMENTS

| 5,136,686 | A  | 8/1992 | Koza |
| 5,140,530 | A  | 8/1992 | Guha et al. |
| 5,249,259 | A  | 9/1993 | Harvey |
| 6,360,191 | B1 | 3/2002 | Koza et al. |
| 6,424,959 | B1 | 7/2002 | Bennett et al. |
| 6,526,556 | B1 | 2/2003 | Stoica et al. |

(Continued)

FOREIGN PATENT DOCUMENTS

JP    2003-248810    9/2003

(Continued)

OTHER PUBLICATIONS

B. Fullmer and R. Miikkulainen, "Using marker-based genetic encoding of neural networks to evolve finite-state behaviour", Toward a Practice of Autonomous Systems. Proceedings of the First European Conference on Artificial Life, MIT Press, 1991 a copy of reference can be found at "citeseer.ist.psu.edu/fullmer91using.html".*

(Continued)

*Primary Examiner*—Joseph P Hirl
*Assistant Examiner*—Lut Wong
(74) *Attorney, Agent, or Firm*—Blank Rome LLP

(57) ABSTRACT

A method for the genetic representation of a network (100), the network having one or more devices (20, 30, 70, 80), each device comprising at least one terminal (21, 22, 23; 71, 72) connected to at least one other terminal (21, 22, 23; 71, 72, 61) by a link with a value of interaction strength. The method includes associating with the devices terminal (21, 22, 23; 71, 72) a first sequence of characters (121, 122, 123; 171, 172), associating with the other terminal (21, 22, 23; 71, 72, 61) a second sequence of characters (121, 122, 123; 171, 172; 162), mapping at least part of the first sequence of characters (121, 122, 123; 171, 172) and at least part of the second sequence of characters (121, 122, 123; 171, 172; 161) to the value of interaction strength in order to determine the value of interaction strength.

19 Claims, 17 Drawing Sheets

U.S. PATENT DOCUMENTS

| | | |
|---|---|---|
| 6,601,053 B1 | 7/2003 | Schaffer et al. |
| 6,766,497 B2 | 7/2004 | Anderson |
| 2003/0212645 A1 | 11/2003 | Schaffer et al. |
| 2004/0030414 A1 | 2/2004 | Koza et al. |
| 2004/0048306 A1 | 3/2004 | Anderson |
| 2005/0071302 A1 | 3/2005 | McGuffin et al. |

FOREIGN PATENT DOCUMENTS

| | | |
|---|---|---|
| WO | WO 90/11568 | 10/1990 |
| WO | WO 91/11771 | 8/1991 |
| WO | WO 00/57550 | 9/2000 |
| WO | WO 01/18525 A2 | 3/2001 |

OTHER PUBLICATIONS

D. Curran and C. O'Riordan "Applying Evolutionary Computation to Designing Neural Networks: A Study of the State of the Art" Technical Report No. : NUIG-IT-111002, 2002. a copy of reference can be found at http://www.it.nuigalway.ie/publications/TR/abstracts/NUIG-IT-111002.pdf.*

Mattiussi, C., Waibel, M. and Floreano, D. (2004) "Measures of Diversity for Populations and Distances Between Individuals with Highly Reorganizable Genomes." Evolutionary Computation , 12(4) pp. 495-515.*

J.C. Astor, C. Adami, A Developmental Model for the Evolution of Artificial Neural Networks, Artificial Life, 2001, 189-218, vol. 6, No. 3,, Massachusetts Institute of Technology.

W. Banzhaf, Artificial Regulatory Networks and Genetic Programming, pp. 1-20; Chapter 4 of Genetic Programming—Theory and Application by R. Rioloetal, University of Dortmund, Germany, 2003.

Peter J. Bentley, Fractal Proteins, Genetic Programming and Evolvable Machines, 2004, pp. 71-101, vol. 5, Kluwer Academic Publishers, The Netherlands.

Josh Bongard, Evolving Modular Genetic Regulatory Networks, IEEE 0-7803-7282-4, 2002, pp. 1872-1877, Artificial Intelligence Laboratory, University of Zurich, Switzerland.

Angelo Cangelosi, Domenico Parisi, Stefano Nolfi, Cell Division and Migration in a "Genotype" for Neural Networks, Computation in Neural Systems, 1994, pp. 497-515, vol. 5, IOP Publishing Ltd., United Kingdom.

Frank Dellaert, Randall D. Beer, Toward an Evolvable Model of Development for Autonomous Agent Synthesis, Department of Computer Engineering and Science, Department of Biology, Case Western Reserve University, Cleveland, Ohio, 12 pages, 1994.

Peter Eggenberger, Creation of Neural Networks Based on Developmental and Evolutionary Principles, AILab and Software Engineering, Department of Computer Science, University of Zurich, Germany, 6 pages, 1997.

Nicholas Geard, Janet Wiles, Structure and Dynamics of a Gene Network Model Incorporating Small RNAs, IEEE 0-7803-7804-0, 2003, pp. 199-206, Australia.

J. B. Grimbleby, Automatic Analogue Circuit Synthesis Using Genetic Algorithms, IEE Proc.-Circuits Devices Syst., Dec. 2000, vol. 147, No. 6, pgs, pp. 319-323.

J. B. Grimbleby, Automatic Analogue Network Synthesis Using Genetic Algorithms, Generic Algorithms in Engineering Systems: Innovations and Applications, Jun. 22, 1995, pp. 53-58, No. 414, Conference Publication, United Kingdom.

Frederic Gruau, Automatic Definition of Modular Neural Networks, Jan. 11, 1995, pp. 1-44, Stanford University, California.

Jennifer Hallinan, Janet Wiles, Evolving Genetic Regulatory Networks Using an Artificial Genome, Conferences in Research and Practice in Information Technology, 2004, vol. 29, 2nd Asia-Pacific Bioinformatics Conference, New Zealand, 6 pages.

Nick Jakobi, Harnssing Morphogenesis, CSRP 423 School of Cognitive and Computing Sciences, United Kingdom, 13 pages, 1995.

Paul J. Kennedy, Thomas R. Osborn, A Model of Gene Expression and Regulation in an Artificial Cellular Organism, Complex Sciences, 2001, pp. 33-59, vol. 13, Complex Systems Publications, Inc., Australia.

Hiroaki Kitano, Designing Neural Networks Using Genetic Algorithms with Graph Generation System, Complex Systems, 1990, pp. 461-476, vol. 4, Complex Systems Publications, Inc., Pittsburgh.

Kunikazu Kobayashi, Masanao Ohbayashi, A New Indirect Encoding Method With Variable Length Gene Code to Optimize Neural Network Structures, IEEE 0-7803-5529-6/99, 1999, pp. 4409-4412, Department of Computer Science & Systems Engineering, Tokyo.

John R. Koza, Forrest H. Bennett III, David Andre, Martin A. Keane, Darwinian Invention and Problem Solving, Genetic Programming III, 1999, Morgan Kaufmann Publishers, San Francisco, 2 pages.

Jason D. Lohn, Silvano P. Colombano, A Circuit Representation Technique for Automated Circuit Design, IEEE 1089-778X, Transaction on Evolutionary Computation, Sep. 1999, pp. 205-219, vol. 3, No. 3, United States.

Michael Adam Lones, Thesis entitled Enzyme Genetic Programming, Modelling Biological Evolvability in Genetic Programming, Sep. 2003, pp. 1-200, United Kingdom.

Michael A. Lones, Andy M. Tyrrell, Modelling Biological Evolvability: Implicit Context and Variation Filtering in Enzyme Genetic Programming, Biosystems, Aug. 2003, pp. 229-238, vol. 76, Elsevier, United Kingdom.

Claudio Mattiussi, Thesis entitled Evolutionary Synthesis of Analog Networks, 2004-2005, Thesis No. 3199, pp. 1-296 (with 3 pg. CV attached), Ecole Polytechnique Federale de Lausanne, France.

Claudio Mattiussi, Dario Floreano, Evolution of Analog Networks Using Local String Alignment on Highly Reorganizable Genomes, proceedings at the Conference on Evolution Hardware, IEEE 0-7695-2145-2/04, 2004, United States.

Claudio Mattiussi, Dario Floreano, Connecting Transistors and Proteins, Autonomous Systems Laboratory, Switzerland, 6 pages.

Claudio Mattiussi, Markus Waibel, Dario Floreano, Measures of Diversity for Populations and Distances Between Individuals with Highly Recognizable Genomes, Evolutionary Computation, 2004, pp. 495-515, vol. 12, No. 4, Massachusetts Institute of Technology, Switzerland.

Stefano Nolfi, Domenico Parisi, "Genotypes" for Neural Networks, pp. 1-14, Italy, 1995.

Joao Carlos Figueira Pujol, Riccardo Poli, Evolving the Topology and the Weights of Neural Networks Using a Dual Representation, Applied Intelligence, 1998, pp. 73-84, Kluwer Academic Publishers, United States.

Tom Quick, Chrystopher L. Nehaniv, Kerstin Dautenhahn, Graham Roberts, Evolving Embodied Genetic Regulatory Network-driven Control Systems, Department of Computer Sciences, University College of London, United Kingdom, 12 pages, 2003.

Torsten Reil, Dynamics of Gene Expression in an Artificial Genome—Implications for Biological and Artificial Ontogeny, School of Cognitive and Computing Sciences, University of Sussex, United Kingdom, 11 pages, 1999.

Moshe Sipper, Eduardo Sanchez, Daniel Mange, Marco Tomassini, Andres Perez-Uribe, Andre Stauffer, a Phylogenetic, Ontogenetic, and Epigenetic View of Bio-Inspired Hardware Systems, IEEE Transactions on Evolutionary Computation, Apr. 1997, pp. 83-97, vol. 1, No. 1.

Kenneth O. Stanley, Risto Miikkulainen, Evolving Neural Networks Through Augmenting Topologies, Evolutionary Computation, 2002, pp. 99-127, vol. 10, No. 2, Massachusetts Institute of Technology, United States.

Kenneth O. Stanley, Risto Miikkulainen, Competitive Coevolution Through Evolutionary Complexification, Journal of Artificial Intelligence Research, Feb. 2004, pp. 63-100, vol. 21, AI Access Foundation and Morgan Kaufmann Publishers, United States.

James Watson, Janet Wiles, Jim Hanan, Towards More Relevant Evolutionary Models: Integrating an Artificial Genome with a Developmental Phenotype, University of Queensland, Australia, 11 pages, 2003.

Xin Yao, Evolving Artificial Neural Networks, Proceedings of the IEEE, Sep. 1999, pp. 1423-1447, vol. 87, No. 9, United States.

D. Whitley, T. Starkweather, C. Bogart, Genetic Algorithms and Neural Networks: Optimizing Connections and Connectivity, Parallel Computing, 1990, pp. 347-361, vol. 14, Elsevier Science Publishers B.V., North-Holland.

Ricardo S. Zebulum, Marley Vellasco, Marco Aurelio Pacheco, Variable Length Representation in Evolutionary Electronics, Evolutionary Computation, 2000, pp. 93-120, vol. 8, No. 1, Massachusetts Institute of Technology, United States.

\* cited by examiner substitution matrix

| | A | B | C | D | E | F | G | H | I | J | K | L | M | N | O | P | Q | R | S | T | U | V | W | X | Y | Z |
|---|---|---|---|---|---|---|---|---|---|---|---|---|---|---|---|---|---|---|---|---|---|---|---|---|---|---|
| A | 4 | 3 | 2 | 1 | 0 | -1 | -2 | -3 | -4 | -5 | -5 | -5 | -5 | -5 | -5 | -5 | -5 | -5 | -5 | -4 | -3 | -2 | -1 | 0 | 1 | 2 | 3 |

⋮ indel vector

| | A | ... |
|---|---|---|
| − | -3 | | substitution matrix

| | A | B | C | D | E | F | G | H | I | J | K | L | M | N | O | P | Q | R | S | T | U | V | W | X | Y | Z |
|---|---|---|---|---|---|---|---|---|---|---|---|---|---|---|---|---|---|---|---|---|---|---|---|---|---|---|
| A | 2 | 1 | 0 | -1 | -2 | -3 | -3 | -3 | -3 | -3 | -3 | -3 | -3 | -3 | -3 | -3 | -3 | -3 | -3 | -3 | -3 | -3 | -2 | -1 | 0 | 1 |

⋮ indel vector

| | A | ... |
|---|---|---|
| − | -2 | |

//  # METHOD AND DEVICE FOR EVOLVING A NETWORK USING A GENETIC REPRESENTATION

This application claims priority of Provisional Application Ser. No. 60/693,119 filed on Jun. 23, 2005, the contents of which is incorporated herein by reference.

FIELD OF THE INVENTION

The present invention relates to a method and to a device for the genetic representation of artificially evolvable networks and to a corresponding genetic representation of artificially evolvable networks.

DESCRIPTION OF RELATED ART

The significant increase in the available computational power that took place in recent decades has been accompanied by a growing interest in the application of the evolutionary approach to the synthesis and reverse engineering of many kinds of systems and, in particular, to the synthesis and reverse engineering of systems like electronic circuits, neural networks, biological networks such as metabolic networks, signaling networks, gene regulatory networks and, more generally, autonomous systems, for which no satisfying systematic and general design and reverse engineering methodology has been found to date.

In short, an evolutionary design or reverse engineering methodology maintains a population of individuals, for example of networks, in the form of a genetic description called genome or genotype for each individual. Each genome is mapped by a suitable method into an instance, called phenotype, of the system, for example of the network, to be designed or reverse engineered. Then, the phenotype is tested with regard to the function that the designed system is expected to perform, or with regard to the compliance with the signature of the system that must be reverse-engineered that the evolved system is expected to display. A value of fitness for each individual ensues, which is used to subject the population to a process of differential reproduction accompanied by the action of genetic operators that are intended to mimic the process of mutation and recombination that characterizes the replication of the genomes of biological populations. The steps of such an evolutionary methodology form what is often referred to as genetic or evolutionary algorithm.

The evolutionary approach has been applied to the design and reverse engineering of many kinds of systems, and, for example, within the realm of evolutionary robotics, to the development of control systems for autonomous robots. The evolution of autonomous robots able to perform simple tasks in simple environments has indeed encountered considerable success. However, the current approach met with considerable difficulties when applied to the development of controllers for significantly more sophisticated tasks.

The main difficulty, in this respect, appears to be the lack of a convincing methodology for achieving an incremental increase of complexity during the evolution and for producing a truly open-ended evolutionary process. Prior art evolutionary approaches often employ genotypes having fixed structures, along with simple, direct mappings of the genotype space to the phenotype space, which establish a one-to-one correspondence between parts of the genotype and phenotypic traits. A drawback of such methods is they have little chance of leading to radical innovation.

Other evolutionary approaches permit significant changes in the population to be evolved, but make use of complex genotypes. U.S. Pat. No. 5,136,686 describes for example a method requiring a tree-shaped genotypic representation, whereas the genetic operators such as duplication, mutation, etc. are applied on branches of the trees. A major drawback of such an approach is thus the complexity of the used genetic representation which implies complex operations when synthesizing or reverse engineering a complex phenotype.

An aim of the invention is thus to propose a simple method for the representation of networks offering a great potential for an evolutionary increase of complexity.

Another aim of the invention is to propose a device for the genetic representation of a network according to the proposed method.

Still another aim of the invention is to propose a simple genetic representation of a network allowing the use of evolutionary algorithms offering a great potential for an increase of complexity of the generated networks.

BRIEF SUMMARY OF THE INVENTION

According to the invention, these aims are achieved by means of a method for the genetic representation of a network, the network comprising one or more devices, each device comprising at least one terminal connected to at least one other terminal by a link characterized by a value of interaction strength, the method comprising the steps of:
  associating with the device's terminal a first sequence of characters,
  associating with the other terminal a second sequence of characters,
  mapping at least part of the first sequence of characters and at least part of the second sequence of characters to the value of interaction strength in order to determine the value of interaction strength.

According to the invention, these aims are also achieved by means of a genome for the genetic representation of a network, the genome being constituted of a sequence of characters belonging to a genetic alphabet, and comprising at least one device token determining the nature of a device of the network, at least one terminal token indicating the presence of a sequence of character associated with a terminal of said device.

According to the invention, these aims are also achieved by means of a method for the synthesizing of a network from its genome, the genome being constituted of a sequence of characters belonging to a genetic alphabet, the method comprising the steps of:
  scanning the genome in a predetermined direction,
  detecting the presence in the genome of a device token signaling the presence in the network of a corresponding device,
  detecting the presence in the genome of a terminal token indicating the presence of a first sequence of characters associated with a terminal of the device,
  mapping at least part of the first sequence of characters and at least part of a second sequence of characters associated with another terminal to a value of interaction strength characterizing a link connecting the device's terminal to the other terminal, in order to determine the value of interaction strength.

According to the invention, these aims are also achieved by means of a method for the genetic representation of a network into a genome constituted of a sequence of characters belonging to a genetic alphabet, the network comprising at least one device comprising at least one terminal connected to another terminal by a link characterized by a value of interaction strength, the method comprising the steps of:

inserting into the genome a device token signaling the presence in the network of the device, inserting into the genome a terminal token indicating the presence of a first sequence of characters associated with the device's terminal, wherein said first sequence of characters determines a value of interaction strength characterizing a link connecting the device's terminal with another terminal when at least part of the first sequence of characters and at least part of a second sequence of characters associated with the other terminal are mapped to said value of interaction strength.

According to the invention, these aims are also achieved by means of a computer program directly loadable in the memory of a computer system and performing the steps of one or more of the methods described above when it is run on a computer.

According to the invention, the genetic representation of a network is based on the association of sequences of characters extracted from a genome with the terminals of the devices that can appear in the network. In a preferred embodiment, tokens are used to identify the devices, the sequences associated with their terminals, and the sequences associated with the evolvable parameters. The connection of the devices decoded from the genome is based on the application of a device interaction map that associates a value of interaction strength with each pair of sequences of characters. The method used to define the connection of the devices decoded from the genome is preferably extended to define the connections between the evolved circuit and predefined external devices, and to allow the evolution of compartmentalized networks. Thanks to the method of the invention, various genetic operators can be applied to the artificial genome encoding the network to be evolved, thus allowing for an overall more efficient evolution process.

BRIEF DESCRIPTION OF THE DRAWINGS

The invention will be better understood by with the aid of the description of an embodiment given by way of example and illustrated by the figures, in which.

DETAILED DESCRIPTION OF POSSIBLE EMBODIMENTS OF THE INVENTION

The Artificial Genome

According to a preferred embodiment of the invention, a genome representing an artificial evolutionary network is composed of one or more finite and nonempty sequences of characters. The sequences of characters that compose the genome are also called chromosomes, and the characters that compose the chromosomes are also called nucleotides. The nucleotides preferably belong to a finite genetic alphabet G, whose size is denoted by |G|. Within the frame of the invention, the value of |G| can be chosen to be any positive integer. As will be shown later, this value influences in particular the possibility of generating large sets of independent sequences. In the following description, the genetic alphabet is for example chosen to be the uppercase alphabetic characters of the ASCII character set. Other alphabets of different lengths are however also possible within the frame of the invention.

Figure 1:
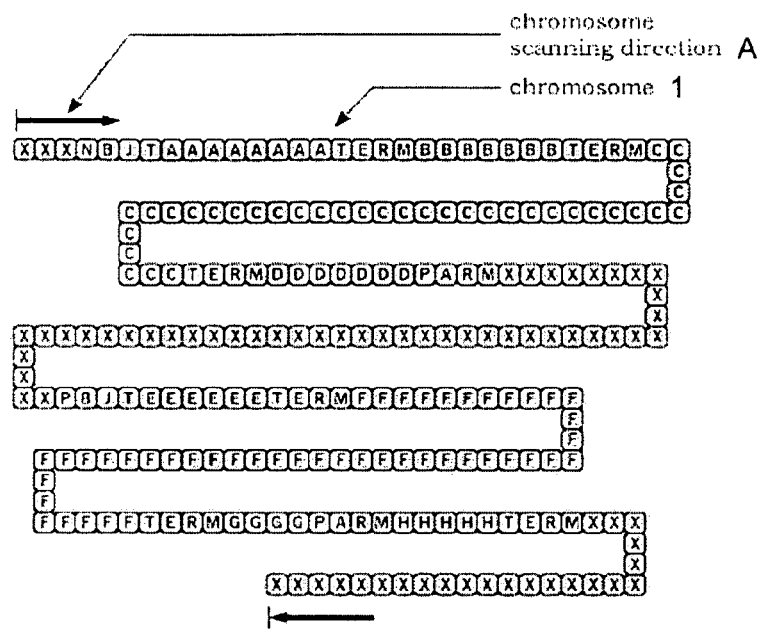
FIG. 1 shows a genome according to an embodiment of the invention, comprising a single chromosome.

FIG. 1 shows an example of a genome according to an embodiment of the invention, comprising a chromosome 1. The chromosome 1 is a preferably unstructured sequence of characters belonging to the genetic alphabet. According to the invention, the genome represents a network comprising preferably at least one device with terminals and possibly with some evolvable parameter whose value determines a characteristic of the device. The decoding of the genome thus permits the synthesis of the corresponding network. This decoding implies sequentially reading and decoding the chromosomes of the genome according to a predefined direction indicated by the arrows A.

According to the invention, a device set is preferably defined which specifies the kind of devices that can appear in the network represented by the genome. For example, if the represented network is an analog electronic circuit, the elements of the device set preferably include a few types of transistors and/or other electronic components. If the represented network is a neural network, however, the elements of the device set preferably include a few types of artificial neuron models. Other types of networks and corresponding devices are possible within the frame of the invention.

According to the invention, the genetic representation of the network further associates sequences of characters extracted from the genome with the terminals and/or to the evolvable parameters, if any, of the devices that compose the network encoded by the genome.

In a preferred embodiment, a collection of specific sequences of characters, or tokens, is defined. As will be illustrated with the examples below, the role of the tokens is to signal the presence of fragments of genome associated with the devices of the network, and to delimit the sequences of nucleotides that must be extracted from the genome and associated with the terminals and/or with the parameters of the devices. In order to permit the representation of all devices belonging to the device set, one preferably unique device token is defined for each device of the device set. In a preferred embodiment, a terminal token and/or a parameter token are further defined, which are used for the identification of the sequences that must be extracted from the genome and associated with the terminals and/or with the parameters of the devices.

Figure 2:
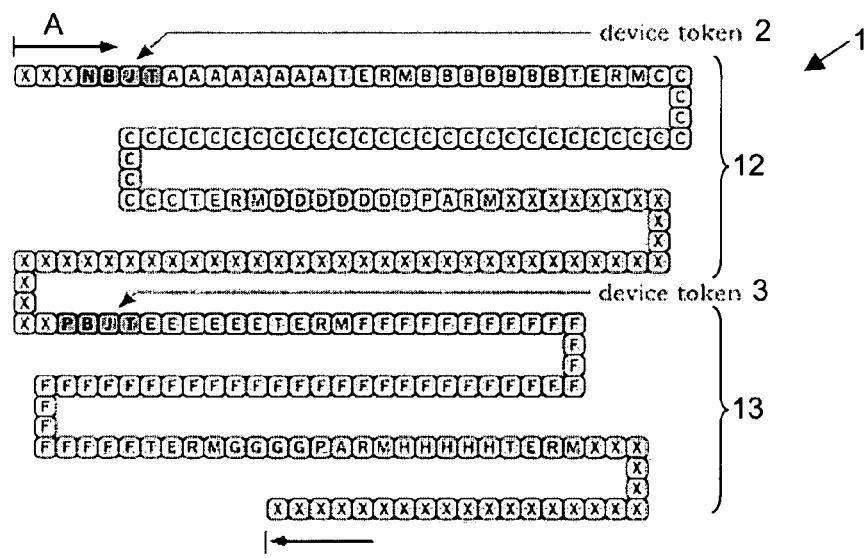
FIG. 2 shows a chromosome according to an embodiment of the invention, with two device tokens.

According to a preferred embodiment of the invention, the device tokens signal the start of a fragment of genome potentially encoding a corresponding device. FIG. 2 shows for example a chromosome 1 belonging to a genome encoding an electronic circuit. In this chromosome 1, a device token NBJT 2 signals the start of a fragment 12 potentially representing an instance of a bipolar junction transistor of type N(NPN BJT), and a device token PBJT 3 identifies the start of a fragment 13 potentially representing an instance of a bipolar transistor of type P(PNP BJT).

As hinted above, the presence of a device token 2, 3 in the genome is only potentially indicative of the presence of a corresponding device in the decoded network. Preferably, a device is actually encoded in the genome only if all the sequences of characters that must be associated with the terminals and to the parameters of that device are all present in the fragment of genome 12, 13 that follows the device token 2, 3.

According to a preferred embodiment of the invention, the terminal tokens and the parameter tokens signal the end of a fragment of genome that is associated with a terminal or with a parameter, respectively, and the start of the successive fragment associated with another terminal or parameter, if any. Preferably, all the terminal and parameter tokens required by a particular device must thus be present in the corresponding genome fragment such that the corresponding device is actually encoded.

Figure 3:
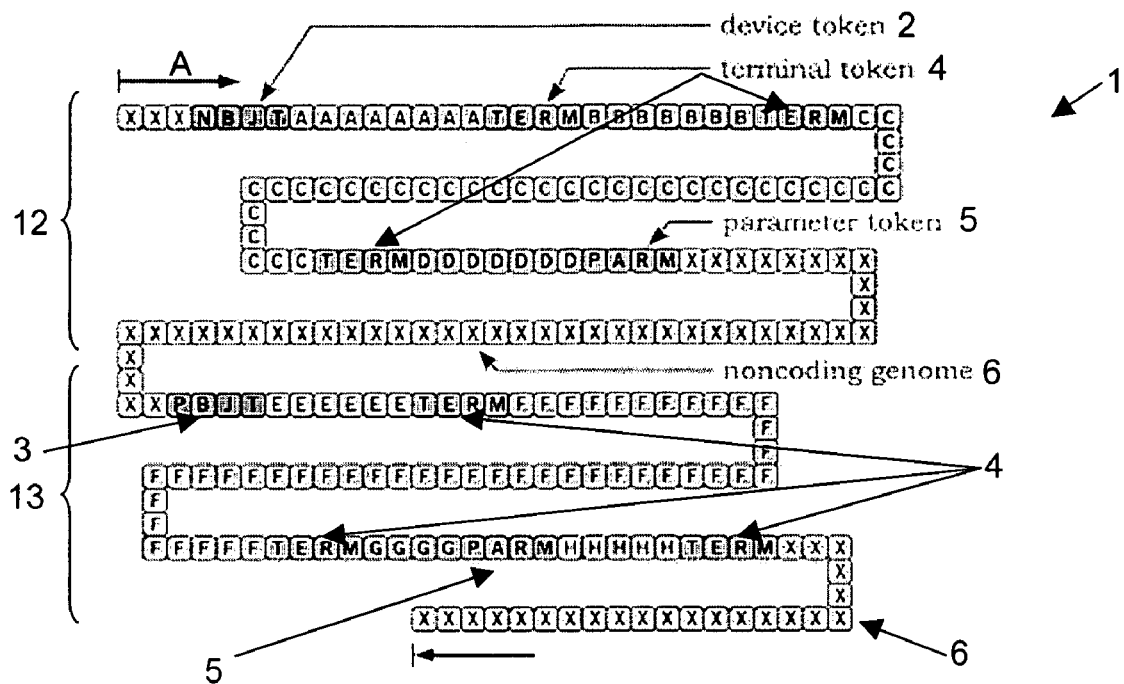
FIG. 3 shows a chromosome according to an embodiment of the invention, encoding two electronic devices.

FIG. 3 shows an example of a chromosome 1 representing two BJT transistors, each comprising three terminals. Here, besides the device tokens NBJT 2 and PBJT 3, the token TERM is used as terminal token 4, and the token PARM is used as parameter token 5. In this example, each BJT transistor is assumed to have, besides its standard three terminals, one evolvable parameter. The fragments of genome not corresponding to tokens and not associated with terminals or parameters, correspond simply to non coding genome 6. Note that the use of evocative tokens like NBJT, PBJT, TERM, and PARM in the examples, derives simply from the desire to facilitate the visual inspection of the genome. Furthermore, the use of similar tokens, like for example NBJT and PBJT, for similar devices is a choice that lets evolution transform one device into the other with a mutation as simple as a single nucleotide substitution. This facilitates the evolutionary production of networks that have a given structure but use different devices.

The length of the tokens and the size of the genetic alphabet determine the probability of randomly generating the tokens. With an alphabet of size |G|, the probability $p_t$ of randomly generating a token t of length |t| is $|G|^{-|t|}$. Although the random generation of a token is perfectly acceptable and can even benefit the evolutionary process, if the value of $p_t$ is too large, a randomly generated or randomly mutated genome would be almost surely cluttered with spurious tokens, and this would interfere with the evolutionary process. Given the genetic alphabet and a maximum acceptable value for $p_t$ (typically following from heuristic considerations), a minimal length for the tokens follows. The examples shown in FIG. 1, FIG. 2 and FIG. 3 use for example the values $|G|=26$ and $|t|=4$ resulting into a probability $p_t \approx 2.2 \cdot 10^{-6}$ which ensures that, on average, very few spurious tokens are generated in a genome with a length of some thousand nucleotides.

The number and kind of elements, for example terminals and/or parameters, required for the correct decoding of a device varies from device to device. For example—considering for the moment only the terminals—a bipolar transistor usually requires the existence of three sequences associated with its three terminals, a capacitor requires the existence of two sequences associated with its two terminals, whereas an artificial neuron could be specified as requiring the existence of two sequences associated with the input and output terminals, respectively, or could instead be specified as requiring the presence of at least one sequence associated with its output and an arbitrary number of sequences associated with a corresponding number of inputs. The number of sequences associated with device parameters can also vary from device to device, and depends on how many evolvable parameters a given device is attributed. For example, in an embodiment, completely predefined bipolar transistors are used, in which case no evolvable parameters is associated with these devices. In another embodiment, the transistor's current gain β, for example, is assumed to be evolvable, in which case there is one evolvable parameter that is associated with the transistor. In still another embodiment, both types of transistors are used: transistors with evolvable parameters, and transistors without.

In a variant embodiment, a separate evolvable global description of a particular type of devices is encoded in the genome. The evolution of this global description will for example influence collectively the characteristics of all the devices of the given type, contrary to what happens with evolvable parameters encoded in the fragment of genome corresponding to a device, which refer only to that particular instance of the device. According to the invention, a same genome can comprise global and individual parameters for a given kind of devices.

If the terminals of a device are not interchangeable, as for example in the case of the base, collector, and emitter of a transistor, or in the case of the input and output terminals of an artificial neuron, a predefined association order is preferably specified, for example collector→base→emitter, or output→input. Similarly, if more than one evolvable parameter is present for a given type of device, a predefined association order is also preferably specified for the evolvable parameters.

Since the parameter tokens 5 are preferably different from the terminal tokens 4, terminals and parameters cannot be confused. Hence, they are preferably left free to appear and mix in any order in the fragment of genome 12, 13 that codes a particular device.

FIG. 3 shows for example, a fragment of genome 12 encoding an NPN BJT transistor where the evolvable parameter delimited by the corresponding parameter token 5 is the last element of the fragment 12. But the evolvable parameter could be, within the frame of the invention, the first element of the fragment 12, or the third element, as it is for example the case for the PNP BJT transistor encoded in fragment 13 of the same chromosome 1. This freedom to mix terminal and parameter sequences makes the decoder more tolerant to genome reorganizations.

In a variant embodiment, the sequences associated with each terminal type of a given device, for example with the base, the collector and the emitter of a transistor, or with the input and the output terminals of an artificial neuron, are terminated with a different terminal token. An advantage of this embodiment is that the different terminals can appear in any order in the genome. A disadvantage, however, is that it increases the number of different tokens and thus increases the system's overall complexity. Similarly, different parameter tokens can be used within the frame of the invention for indicating the end of sequences associated with different parameters of a given device.

Device Extraction

The representation technique described above leads to the following procedure for the extraction of the devices encoded in the genome. Each chromosome 1 is scanned along a predefined direction A in search of any of the device tokens 2, 3 belonging to the device set defined for the particular network. If one of the device tokens 2, 3 is found, the fragment of genome 12, 13 starting after the device token is scanned in search of all the terminal and parameter tokens 4, 5 required by the device. If all the required tokens are found before the next device token or before the end of the chromosome 1, a device—for the moment, unconnected—is created and the sequences of characters delimited by the tokens 4, 5 are associated with the terminals and/or parameters of the device. Then, the next device token is searched in the genome, and so on until all the genome has been examined.

Figure 4:
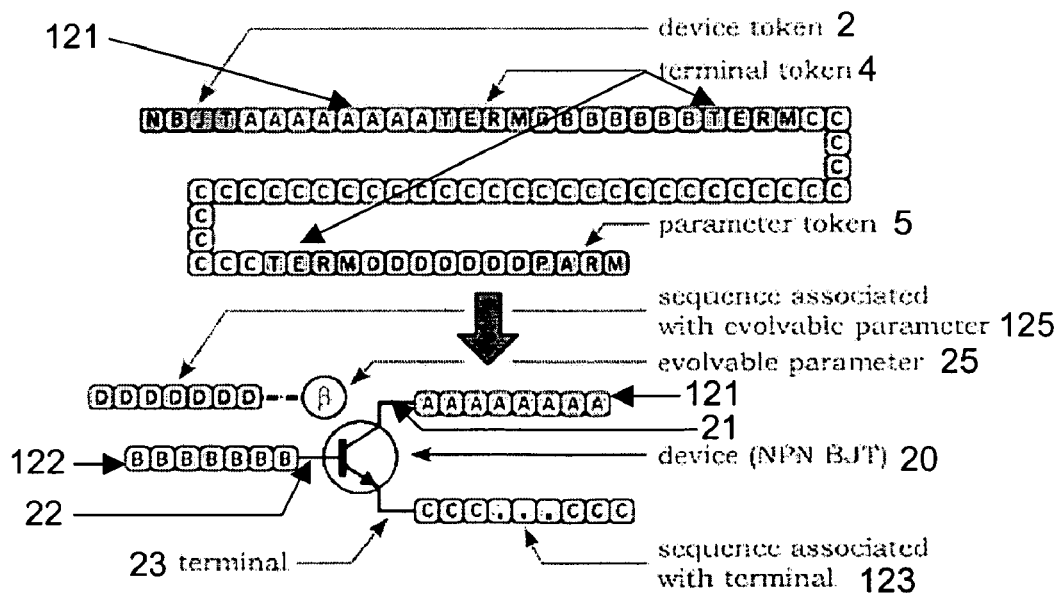
FIG. 4 shows a fragment of the chromosome of FIG. 3 and the corresponding encoded device.

FIG. 4 illustrates an example of decoding of a transistor from a fragment of genome 12 that contains all the tokens 2, 4, 5 required by an NPN BJT transistor 20 with one evolvable parameter 25. In this example, the sequence of nucleotides 121 comprised between the end of the device token 2 and the start of the first terminal token 4, is associated with the first terminal 21 of the transistor 20, the sequence of nucleotides 122 comprised between the end of the first terminal token 4 and the start of the second terminal token 4 is associated with the second terminal 22 of the transistor 20, the sequence of nucleotides 123 comprised between the end of the second terminal token 4 and the start of the third terminal token 4 is associated with the third terminal 23 of the transistor 20, and the sequence of nucleotides 125 comprised between the end of the third terminal token 4 and the start of the parameter token 5, is associated with an evolvable parameter 25 of transistor 20, for example to its current gain β.

Figure 5:
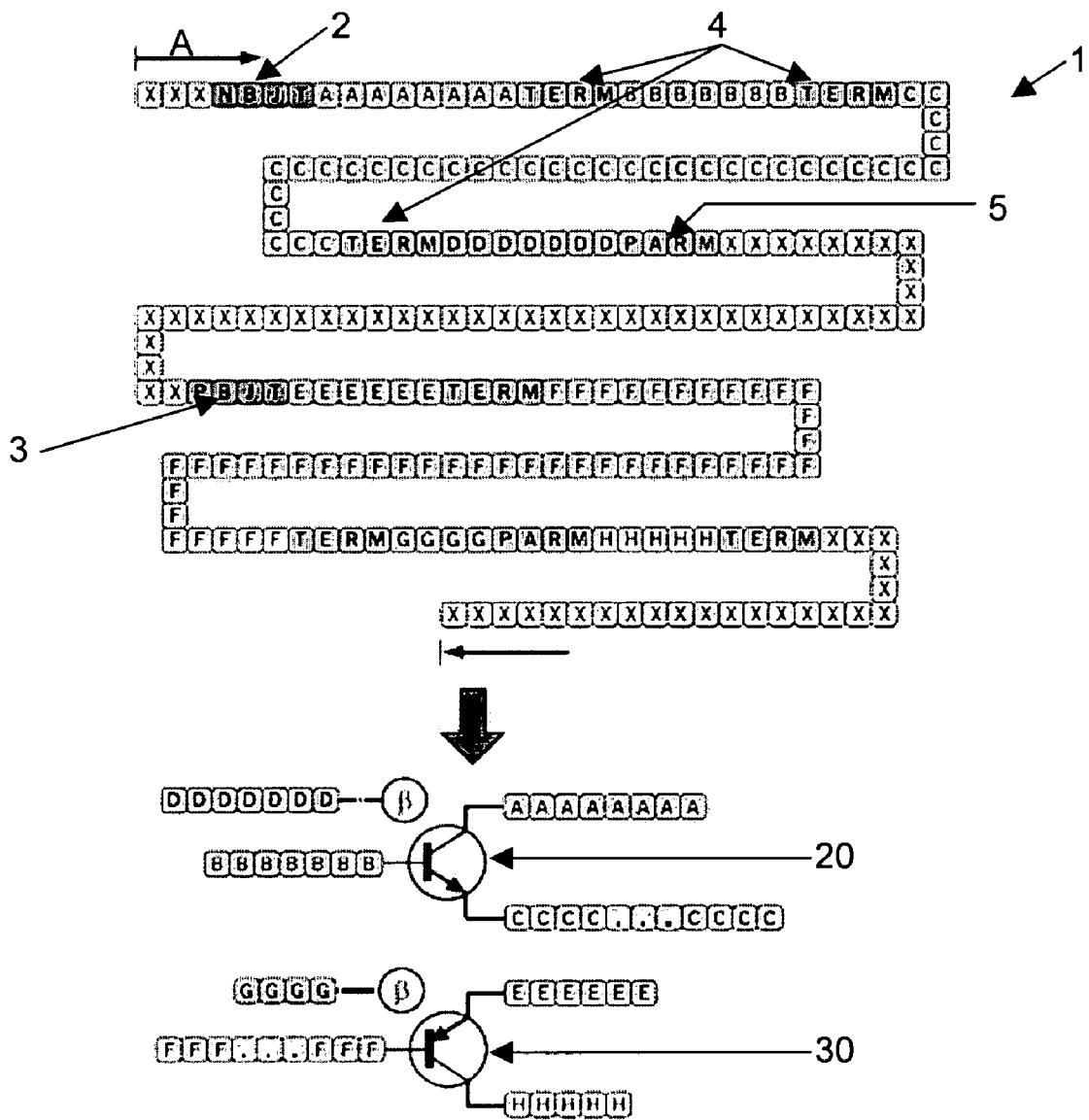
FIG. 5 shows a genome according to an embodiment of the invention and the devices extracted from it.

FIG. 5 shows for example the result of extracting all the devices 20, 30 of an electronic circuit encoded in a genome composed of a chromosome 1.

The procedure of component extraction described above does not admit the overlapping of sequences of characters corresponding to different devices. In a variant embodiment of the invention, however, this overlapping is permitted. According to this variant embodiment, once a device token is found, the chromosome is scanned until all the tokens required for the complete representation of the corresponding device are found or the chromosome end is reached, irrespective of the presence of another device token. In this case, for example, if one of the terminal tokens 4 following the NBJT device token 2 and preceding the PBJT device token 3 of the chromosome 1 represented in FIG. 5 is removed or invalidated, the search of the third terminal token 4 required for fully representing the NPN BJT transistor 20 produces the first terminal token 4 following the PBJT device token 3. Thus the whole sequence from the end of the first parameter token 5 to the start of this terminal token 4 is associated with the third terminal of the transistor 20. A drawback of this embodiment is that, although the presence of device overlapping tends to speed the initial phases of evolution when an evolutionary algorithm is applied on the genome in order to evolve the corresponding network, it also tends to generate an interaction between devices that appears to hamper further evolutionary progress. For this reason, the possibility of device overlapping is preferably excluded. This corresponds to consider potentially associated with a device only the fragment of genome that goes from the end of a device token to the start of the next one, as in the previously described preferred embodiment.

Figure 6:
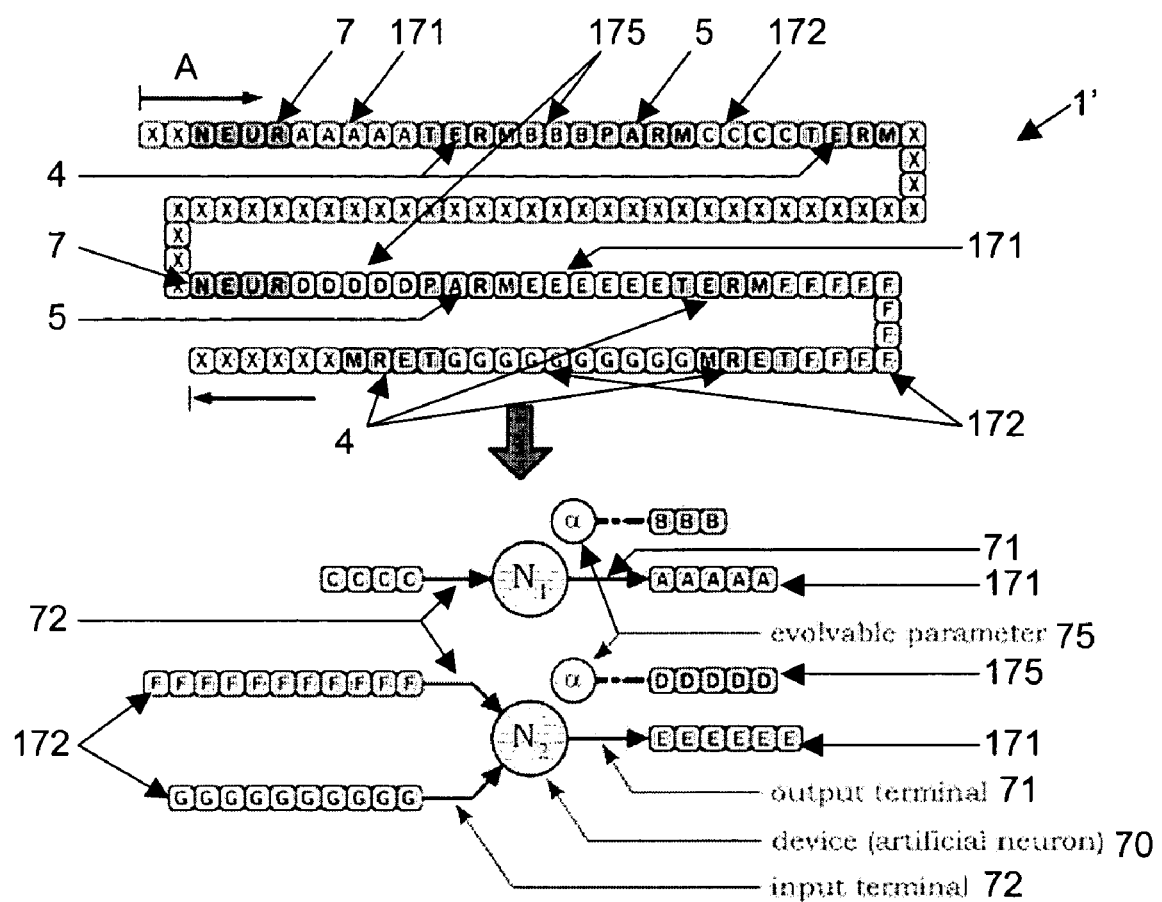
FIG. 6 shows a chromosome according to another embodiment of the invention, that encodes devices belonging to an artificial neural network, and the two neurons extracted from it.

FIG. 6 shows another example of a chromosome 1' encoding the devices of a network. In this example, the network is a neural network and the devices are artificial neurons 70 which are identified by the NEUR device token 7, while the terminals and the parameters are identified by the terminal tokens 4 and by the parameter tokens 5, respectively. Artificial neurons typically comprise one output terminal 71 and one or more input terminals 72. In this example, the neurons 70 are also each assigned an evolvable parameter 75. According to the invention, the chromosome 1' includes, for each completely defined neuron 70, a sequence of characters 171 associated with the input terminal 71, a sequence of character 172 associated with each input terminal 72, and a sequence of character 175 associated with the optional evolvable parameter 75.

Since, as will be explained below, a device interaction map according to the invention for determining the interaction strength between terminals of different devices preferably allows the determination of multiple interactions with a single terminal sequence, it could be sufficient to use and encode in the genome only one output terminal 61 and one input terminal 62 for each neuron 60. To facilitate the task of evolution, however, more than one sequence of characters extracted from the genome can be associated with the input of each neuron. This can be achieved by specifying that the first sequence of characters delimited by a terminal token is associated with the output terminal of the corresponding neuron, while the subsequent ones are associated with the inputs.

FIG. 6 shows an example of this kind of encoding. Here, one of the neurons 70 encoded in the chromosome 1' has a single input sequence 172 whereas the other neuron 70 has two sequences 172 associated with its inputs 72. Note that the case of no associated input sequence could be also accepted, for example to determine within the network bias neurons with fixed output and no inputs. If a distinction between excitatory and inhibitory neurons is desired, it can be obtained by defining different device models, each with a specific device token, for example NEUE for an excitatory neuron and NEUI for an inhibitory neuron. If it is instead required to distinguish excitatory and inhibitory inputs, one can use distinct terminal tokens for the output terminal, the excitatory input terminals, and the inhibitory input terminals.

According to a variant embodiment, the set of devices defined for the genetic representation of neural networks according to the invention include further devices in addition to the conventional neuron models described above, that perform the addition of the input signals. These additional devices include for example network devices that perform the multiplication of two or more input signals. This allows for example the efficient representation of the so-called high-order neural networks, which have great application potential but can generally not be used in prior art genetic representation due to the combinatorial explosion of the number of weights that are associated with the high-order terms. In the genetic representation of the invention, the problem of the combinatorial explosion is avoided since not all high-order terms must be represented but only those corresponding to the multiplication devices encoded in the genome, the selection of which is left to the action of the evolutionary process.

Figure 7:
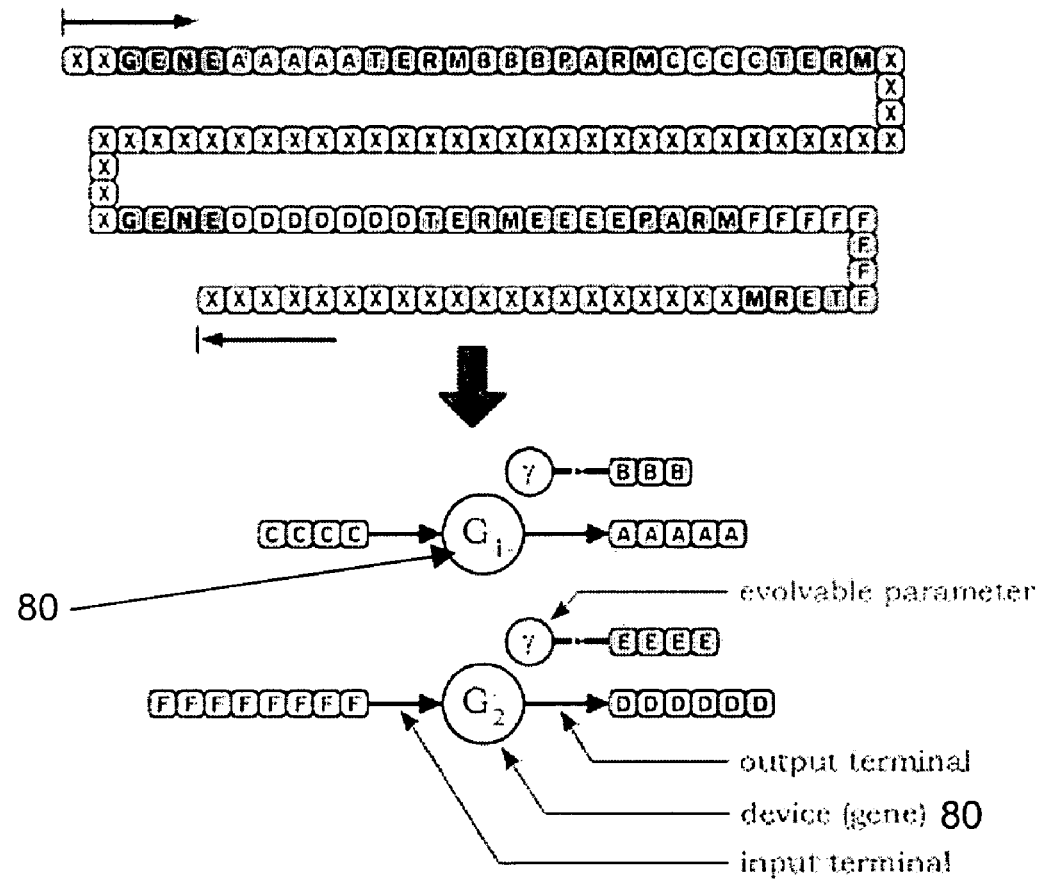
FIG. 7 shows a chromosome according to another embodiment of the invention, that encodes the devices belonging to an artificial genetic regulatory network, and the two genes extracted from it.

In a further example, the encoded network is a genetic regulatory network (GRN). FIG. 7 shows how a GRN can be encoded according to the invention. In this example, the devices are genes 80, and the encoding corresponds, mutatis mutandis, to that of the neurons 70 illustrated in FIG. 6. Like in the case of the neurons 70, if the possibility of having more than one input terminal is required, it can be obtained by stipulating that all terminals tokens following the first must be decoded and interpreted as associating a sequence with an input. If several input and output terminals are required, one can define two distinct terminal tokens for them.

Interaction Strength and Parameter Values

The result of the device extraction method of the invention described above is a collection of unconnected devices 20, 30, 70, 80 that have sequences of characters associated with their terminals and with their evolvable parameters, as illustrated in FIG. 5, FIG. 6 and FIG. 7. To turn this collection of devices into an actual network the devices have to be connected between them, and actual values have to be assigned to their evolvable parameters.

Figure 8:
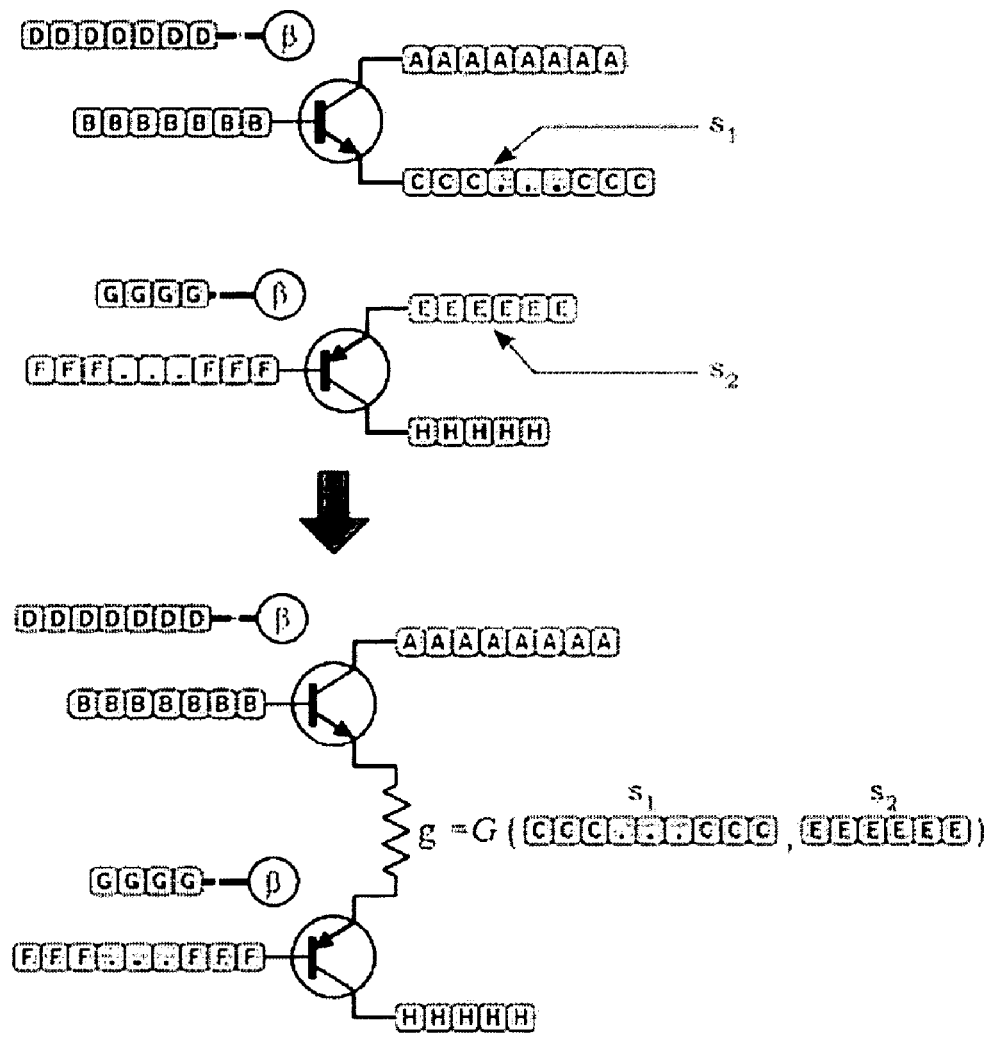
FIG. 8 illustrates the establishment of a connection between two device terminals according to an embodiment of the invention.

According to a preferred embodiment of the invention, the connection of the devices is based on the definition of a device interaction map, which transforms pairs of character sequences associated with two distinct device terminals into a scalar value that represents the strength of the direct interaction between the terminals. For example, if the network is an electronic circuit, the strength of the direct interaction between two device terminals can be represented as a value g of conductance inserted between the terminals. If we denote with $s_1$ and $s_2$ the sequences of characters associated with two distinct terminals, we can denote with $G(s_1,s_2)$ the device interaction map that produces the value of conductance that must be inserted between the two terminals, as illustrated for example in FIG. 8. Repeating this process for each pair of distinct sequences, we obtain a value of conductance between each pair of terminals of the devices extracted from the genome. In this way, the collection of originally unconnected devices is transformed into a network. Note that the device interaction map can preferably associate a null value of conductance with certain pairs of sequences. This corresponds to the absence of direct interaction between terminals carrying those pairs of sequences, and it prevents the need for each device terminal to be necessarily connected to all other device terminals of the network.

Figure 9:
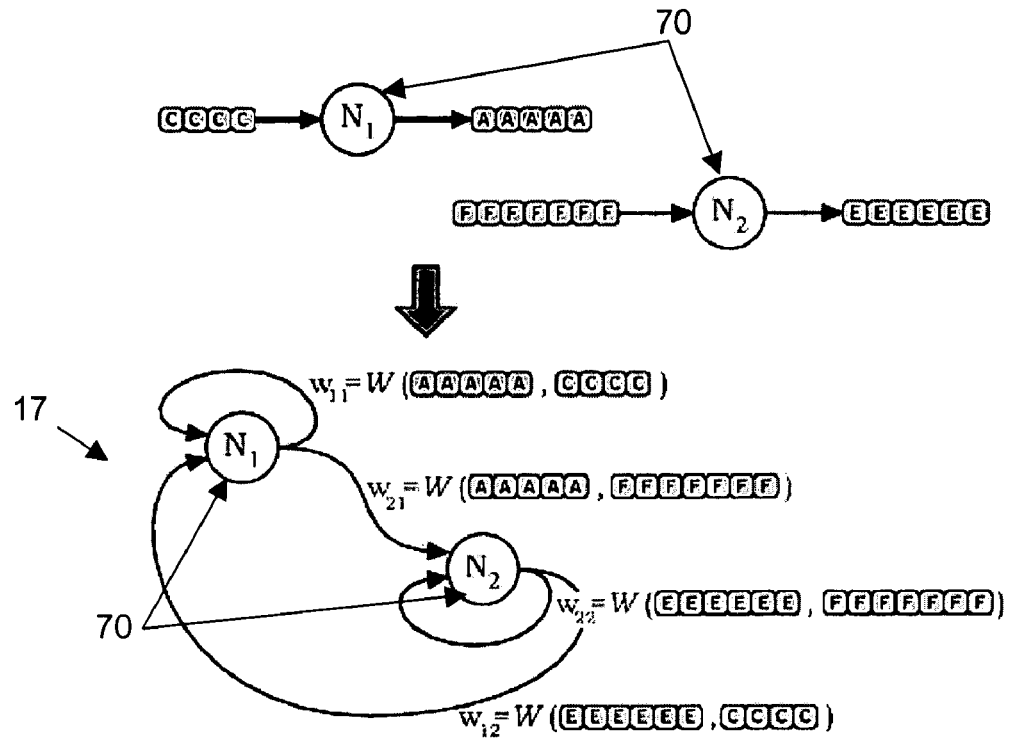
FIG. 9 shows two artificial neurons extracted from a genome according to an embodiment of the invention, and the resulting neural network.

Contrary to the case of electronic circuits, where the terminals of devices such as bipolar transistors do not have a clear characterization as inputs or outputs, in the case of neural networks this characterization exists and it makes sense to consider only the connection of output terminals to input terminals. The value of interaction strength corresponds to what in the terminology of neural networks is called the weight $w_{ij}$ of the link connecting the output of the j-th neuron with the input of the i-th neuron. The device interaction map $W(s_1, s_2)$ that determines the connections will therefore associate values of weights with pairs of sequences of characters associated with one output terminal and one input terminal of the neurons decoded from the genome. FIG. 9 illustrates the establishment of the connections between two neurons 70, which transform the neurons 70 extracted from a genome into a neural network 17, in this example without external inputs and outputs. In this case also, the device interaction map W can preferably associate null values of weights with certain pairs of sequences, thus giving the possibility of leaving pairs of input and output terminals without any direct connection between them.

The case of genetic regulatory networks corresponds closely to that of neural networks, and the corresponding remarks and illustrations apply in general also to this kind of network. There is however a difference in the meaning given to the value of the interaction strength in GRN. Often this value is interpreted as a probability of occupation of a given regulatory site from the part of a regulatory protein. If this is the case, the values of interaction strength are preferably normalized in order to represent probabilities. An variant embodiment, which eliminates the problem of proliferation of interactions from the start, is to retain for each gene only the strongest of the interactions potentially determined by all the pairs of sequences associated with the input terminal of that particular gene and with all the output terminals of all the genes present in the network, considering all other potential interactions recessive.

Figure 10:
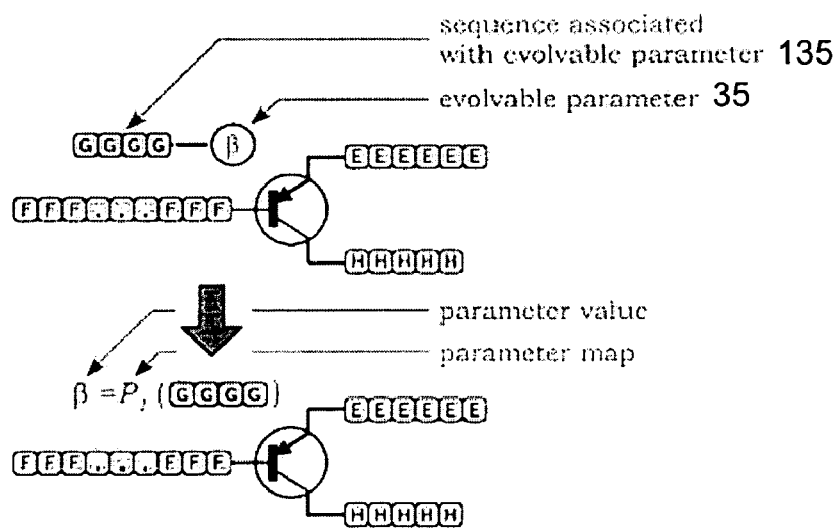
FIG. 10 illustrates how the value of an evolvable parameter is assigned by applying a parameter map to the sequence of characters associated with the parameter.

The assignment of a value to the evolvable parameters is based on the definition of a parameter map $P_1(s)$ that transforms a sequence of characters 135 extracted from the genome and associated with a parameter 35, into the value $\beta$ of the parameter, as illustrated for example in FIG. 10.

Figure 11:
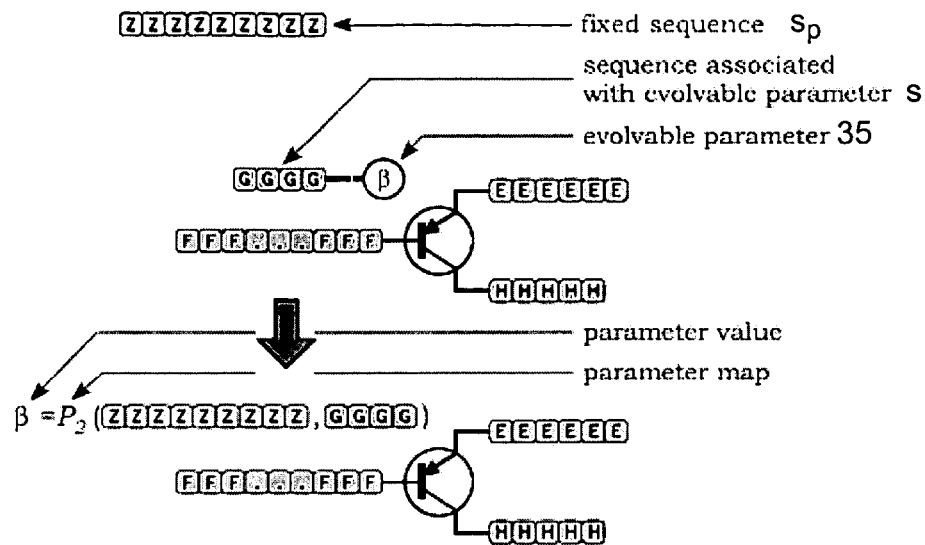
FIG. 11 illustrate a variant embodiment wherein a parameter map involves a sequence associated with the evolvable parameter and a fixed, predefined sequence.

Different methods are possible within the frame of the invention for mapping a sequence of characters into a real number. According to an embodiment, the sequence of characters is for example interpreted as an integer number written in base |G|, and this integer is further mapped into an interval corresponding to the range of variation selected for the parameter. Using this method, however, the nature of the parameter map is possibly very different from that of the device interaction map described above which acts on pairs of sequences. In particular, this is true for the consequences of mutations and reorganizations of the genome on the value of interaction strength and parameter values. For this reason, according to a preferred embodiment, the parameter map $P_1(s)$ is defined as $P_1(s)=P_2(s,s_p)$, where $P_2(s,s_p)$ is a map that associates a parameter value with the pair constituted by the sequence s and a fixed sequence of characters sp, as illustrated for example in FIG. 11. According to this embodiment, both the device interaction map and the parameter map thus imply the mapping of pairs of sequences into scalar values.

Device Interaction Map

According to the invention, the role of the device interaction map is to transform pairs of character sequences associated with two distinct device terminals into a scalar value that represents the strength of the direct interaction between the terminals. This map is thus preferably specific to the type of network considered. For example, in the case of electronic circuits, the device interaction map will preferably produce values of conductance, whereas for neural networks, it will produce weight values which are typically dimensionless, and for genetic regulatory networks it will produce, for example, values of probability of activation of one gene on the part of another gene.

According to a preferred embodiment, the mapping involves a network-specific component and a generic component which provides a given evolvability and complexity-growth potential. This generic component can thus be used for any type of network in order to obtain a device interaction map complying with given prescriptions, without having to reconsider each time the suitability of a device interaction map redefined from scratch for each particular type of network.

This distinction of a generic component from a network-specific component of the device interaction map is illustrated by writing it as a composed interaction map $N(L(s_1, s_2))$ formed by a generic sequence interaction map $L(s_1, s_2)$ that transforms pairs of sequences into abstract and generic sequence interaction values i, and by a network-specific interaction map $N(i)$ that transforms sequence interaction values i into network-specific values of interaction strength.

Within the frame of the invention, the generic sequence interaction map can be defined in different ways. A general observation concerning the device interaction map is that the fact of associating with pairs of sequences a scalar value representing the strength of their interaction defines implicitly a notion of similarity between pairs of sequences.

In an embodiment of the invention, the definition of the sequence interaction map is based on traditional ways of defining the distance between two sequences. One example of such a traditional way is the Hamming distance, which counts the number of differences between two sequences of equal length. Although simple, this choice requires an equal length for all sequences, thus restricting for example the set of admissible genetic operators.

In preferred embodiments of the invention, the sequence interaction map is based on a more flexible definition of the distance or similarity between sequences corresponding to the concept of local alignment of pairs of sequences of characters, which will be described further below.

Figure 13:
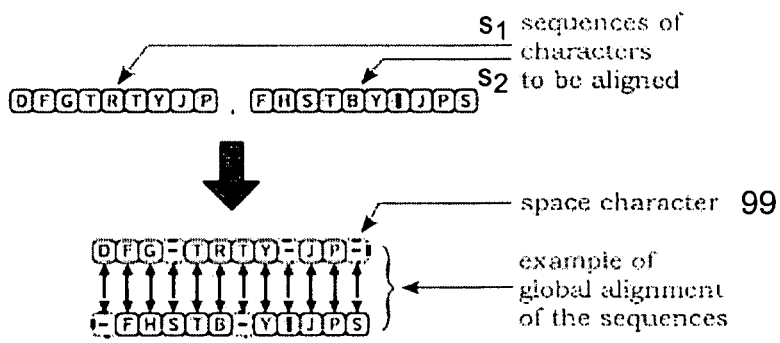
FIG. 13 illustrates an example of global alignment of two sequences of characters.

A global alignment between two sequences of characters is a correspondence between two sequences $s_1$, $s_2$ that puts each character of one sequence in correspondence with a character of the other sequence, or with a special space character 99, as illustrated for example in FIG. 13. Note that, given two sequences $s_1$, $s_2$ of same or different lengths, many different global alignments can be typically established between them by for example changing the positions of the space characters 99.

The concept of global alignment can be used to define a measure of similarity between two sequences, called global alignment score. To define the concept of global alignment score, a substitution score is assigned to each possible correspondence of two characters of the two sequences, an insertion score is assigned to each correspondence of a character of the first sequence with a space, and a deletion score is assigned to each correspondence of a space with a character of the second sequence. According to this embodiment, one sequence is transformed into the other using a series of character substitutions, insertions and deletions, abbreviated as indels, and that the more similar the characters put into correspondence are, the higher their substitution score. For each particular global alignment of two sequences it is therefore possible to assign an alignment value summing the scores of all correspondences established by the alignment. The global alignment score of two sequences is then defined as the highest alignment value attainable considering all the possible global alignments of the sequences. Note that the highest alignment value can be attained by two or more distinct global alignments of the two sequences.

Figure 14:
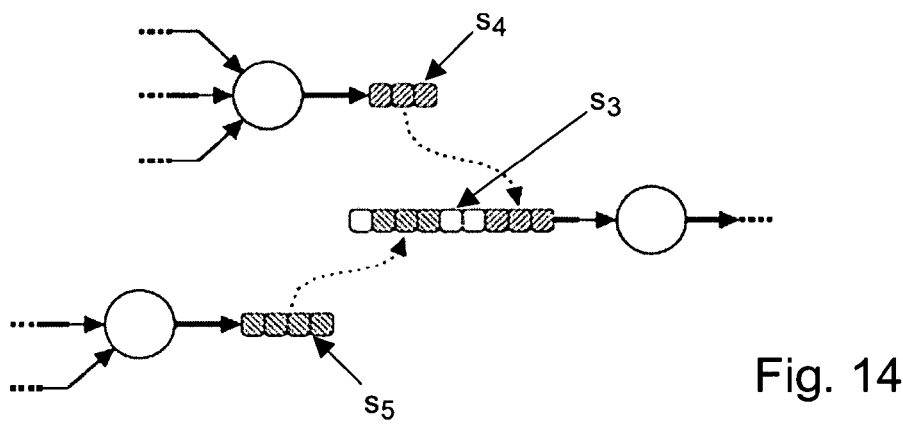
FIG. 14 illustrates the use of a device interaction map that has the possibility of determining multiple independent interactions on a single sequence.

A drawback of global alignment, however, is that it doesn't allow determining multiple independent interactions for a single sequence, as illustrated for example in FIG. 14 where sequence $s_3$ is independently matched to both sequence $s_4$ and sequence $s_5$. This limitation is due to the global nature of the alignment, which forces the establishment of a correspondence between all the characters of the two sequences.

Figure 15:
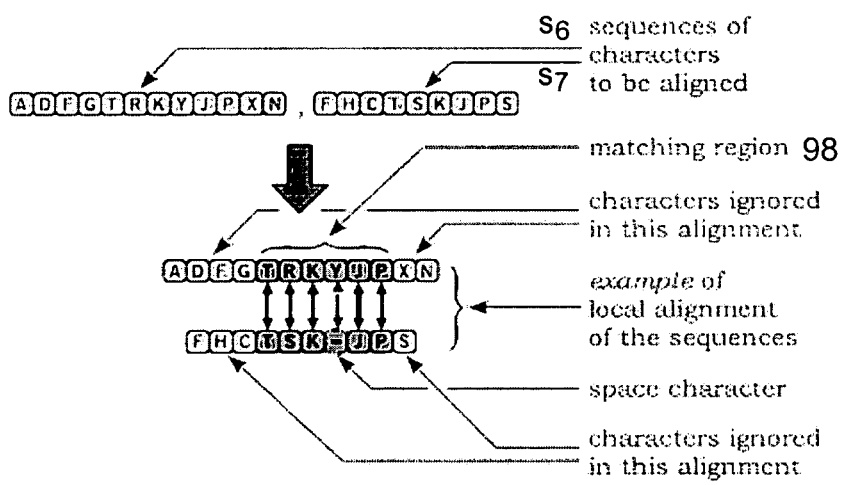
FIG. 15 illustrates an example of local alignment of two sequences of characters.

In a preferred embodiment, the local alignment of two sequences is thus considered instead of their global alignment. As illustrated in FIG. 15, in the case of local alignment, not all characters of both sequences $s_6$, $s_7$ must be put into correspondence, but only the characters of two portions 98 of the sequences, called matching regions. The only condition is that the matching regions 98 be composed of characters that are adjacent in the original sequences $s_6$, $s_7$, so that only the initial and final portions of the sequences $s_6$, $s_7$ can be ignored in the alignment. According to this embodiment, a negative or null value of alignment score is for example assigned to some character substitutions and indels, and the leading and trailing characters of the sequences that do not contribute with a positive score to the alignment value are ignored. The result is an alignment where a single sequence $s_9$ can match independently many other sequences $s_8$, $s_{10}$ with several distinct matching regions 98, as illustrated for example in FIG. 16. As in the case of global alignment, given the substitution, insertion, and deletion score for single characters it is possible to assign to each particular local alignment of two sequences an alignment value summing the scores of all correspondences established by the alignment. The local alignment score of two sequences is defined as the maximum alignment value attainable considering all the possible local alignments of the sequences $s_8$, $s_9$ or $s_9$, $s_{10}$.

The local alignment score defined above is highly suited to the implementation of a sequence interaction map according to the invention, as it is endowed with the following properties:

With a suitable choice of the character substitution and indel scores it can be made highly redundant.

A single sequence can determine multiple independent interactions.

It operates on pairs of sequences of arbitrary length and independently from the original position of the sequences in the genome.

With a suitable choice of the character substitution and indel scores, changes in the sequences can produce both small changes and large variations in the alignment score.

Note that the fact that the alignment score is defined as the maximum of all the alignment values attained by all the possible alignments implies that an alignment realizing the maximum value, i.e. an optimal alignment, masks all the alignments with a smaller alignment value. A mutation in the sequences can degrade the value of a formerly optimal alignment, promoting as new champion one of the previously masked alignments, which can thus be considered a "recessive" alignment relatively to the previously dominant alignment. This is potentially useful in an evolutionary perspective, and it is thus worth mentioning as an additional property of local alignment:

Besides the "dominant" interaction, two sequences can produce several "recessive" interactions.

From the point of view of the computational complexity, at first sight the calculation of the local alignment score of two sequences requires the generation of all possible correspondences of all portions, or substrings, of one sequence with all portions, or substrings, of the other sequence, a feat which is computationally unfeasible for even moderate string lengths. There are, however, algorithms based on dynamic programming that compute the global and local alignment score of two strings of length m and n with computational complexity of order mn in time, order m in space (i.e., in memory), and order |G| in the alphabet size. Algorithms for global alignment are generally referred to as Needleman-Wunsch algorithms, whereas those devoted to local alignment are called Smith-Waterman algorithms. Since both the global and the local alignment of sequences are heavily used in bio-informatics, many references and textbooks exist on the subject. These algorithms will thus not be discussed any further within the frame of this description. The only thing worth noting here concerning the local alignment as described above is that its computational complexity is reasonably low.

However, because of the quadratic computational complexity of such algorithms, a limit is preferably set for the length of the sequences extracted from the genome and associated with the terminals and parameters of the devices.

Figure 12:
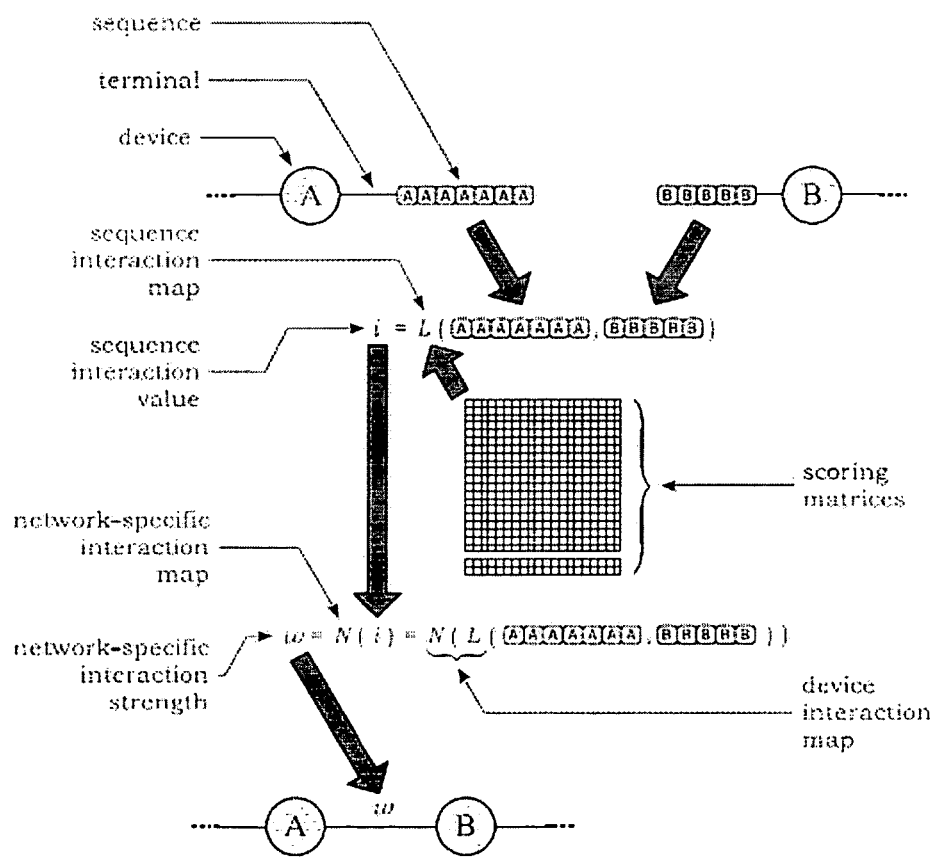
FIG. 12 is a schematic representation of the elements that enter the definition of the device interaction map.

It is preferable, within the frame of the invention, to have the possibility of generating large enough sets of independent sequences in order to keep low the unwanted interference between distinct sequences. This possibility is related to the choice of the alphabet and to the choice of the substitution and indel scores. To proceed with these choices, however, besides considering the problem of interference between sequences, that is, besides considering what we want to avoid in the interaction map, we must ascertain what we positively want to obtain from it. This, in turn, is related to the number of distinct interaction strength values that we want to obtain from the map. Therefore, before considering the problem of alphabet size and scores value, we consider briefly the nature of the network-specific interaction map whose role was briefly described above and in relation to FIG. 12.

The role of the network-specific interaction map is to transform the abstract sequence interaction values produced by the generic sequence interaction map into network-specific values of interaction strength between the terminals of the devices. The domain of the generic sequence interaction map is the set of pairs of character sequences built on the genetic alphabet. If an upper limit is set for the length of the sequences extracted from the genome, this domain is finite, and otherwise it is countable. Hence, the range of the network-specific interaction map is also finite or at most a countable set. The network-specific interaction map must thus associate with each element belonging to this set a value of interaction strength that is meaningful for the actual network.

In practice, the finite resources available for the implementation of the method of the invention imply that the set of possible interaction values is finite. This is not a serious limitation, provided that the interaction values are wisely distributed within the (typically continuous) range of network-specific interaction values.

It is worth examining in some detail the distribution and range of the standardized sets of resistors used in electronic circuit design, because it gives some indication of the total number of values that is considered sufficient in an actual, real-world scenario. The commonest standardized series of resistors is the so-called E12 series, which has 12 elements for each decade of electric resistance value and, consequently, for each decade of electric conductance value. The range of values used by engineers goes typically from 1 Ω to 10 MΩ. Values outside this range are manufactured for special purposes, but are not considered part of the standardized series. Hence, the set of available resistors for the design of the typical electronic circuit comprises eighty-five elements, with values approximately logarithmically distributed across seven decades of electric resistance.

To facilitate the task of evolution, we preferably stipulate within the frame of the invention that the number of available interaction strength values must be sufficient to avoid the need to combine several interactions to span the desired range of values. Note that we could use many more elements than strictly needed, but this would have the undesirable effect of unnecessarily enlarging the search space, since the set of interaction strength values requires a corresponding number of sequence interaction values. In some cases it can be advisable to add to the required number of interaction strength values a few values of sequence interaction corresponding to the absence of any direct interaction. For example, in the case of electronic circuits, a range of low sequence interaction values could be associated with the zero-valued conductance thus corresponding to the insertion of an infinite-valued resistor between the terminals, that is, to the insertion of no resistor at all. This choice is typically dictated by the desire to avoid the presence of too many connections in the network decoded from the genome, which could slow the simulations of the network or complicate their implementation. On the other hand, if the presence of many connections is not a problem, for example if the simulation technique does not suffer from their presence, it is preferable to avoid the use of a "dead-zone" of absence of interaction, to give evolution the possibility of gradually probing the effect of the various interactions.

Another useful expedient is the association of a predefined maximum value of interaction strength with all sequence interaction values above a predefined limit. For example, in the case of electronic circuits, the maximum interaction strength between two terminals corresponds—theoretically—to a null value of resistance, i.e., to an infinite value of conductance of the corresponding connection. Instead of considering arbitrarily large values of conductance which, in practice, are operationally unfeasible, as associated with increasing values of sequence interaction strength, it is preferable to consider a finite and operationally reasonable maximum value of conductance as associated with a given sequence interaction strength, and to transform all sequence interaction strengths above that maximum value into a connection with infinite conductance.

EXAMPLE

Let us consider how a network-specific interaction map $$i \xrightarrow{N(i)} g$$

from a range of integer sequence alignment scores i to a set of conductance values g complying with these indications can be actually defined. Let us assume a logarithmic quantization of the conductance range determining a set of discrete conductance values having $n_d$ elements per decade of conductance value. We denote by $g_0$ the zero-valued conductance, by $g_{min}$ the minimum non null value of conductance, by $g_{max}$ the maximum finite value of conductance, and by $g_\infty$ the infinite-valued conductance. The sequence of conductance values corresponds to $$\{g_0, g_{min}, \alpha g_{min}, \alpha^2 g_{min}, \ldots, \alpha^{n_d-1} g_{min}, 10 g_{min}, 10\alpha g_{min}, \ldots, g_{max}, g_\infty\}$$

where $\alpha=10^{1/n_d}$. Denoting by $n_s$ the number of elements in the subsequence $\{g_{min}, \ldots, g_{max}\}$ (that is, the number of discrete conductance values excluding the connection with infinite conductance represented by $g_\infty$ and the absence of connection represented by $g_0$), $g_{max}$ must satisfy the condition $g_{max}=\alpha^{n_s-1}g_{min}$. Denoting by $i_{min}$ the positive integer sequence interaction value associated with $g_{min}$, we obtain the network-specific interaction map shown in the table below:

| | | |
|---|---|---|
| $i < i_{min}$ | → | $g_0$ |
| $i_{min}$ | → | $g_{min}$ |
| $i_{min} + 1$ | → | $\alpha g_{min}$ |
| $i_{min} + 2$ | → | $\alpha^2 g_{min}$ |
| ... | | ... |
| $i_{min} + n_d - 1$ | → | $\alpha^{n_d-1} g_{min}$ |
| $i_{min} + n_d$ | → | $10 g_{min}$ |
| $i_{min} + n_d + 1$ | → | $10\alpha g_{min}$ |
| ... | | ... |
| $i_{max} = i_{min} + n_s - 1$ | → | $g_{max} = \alpha^{ns-1} g_{min}$ |
| $i > i_{max}$ | → | $g_\infty$ |

Note that $i_{min}$ defines the "dead-zone" of sequence interaction values associated with $g_0$, that is, with the absence of direct interaction. If $i_{min}=0$, no dead zone exists and any positive sequence interaction value (that is, any positive local alignment score) from two sequences associated with device terminals results in the insertion of a conductance between the terminals. The range $i>i_{max}$ of sequence interaction values is associated with the connection having an infinite-valued conductance which is represented by $g_\infty$. Setting $i_{max}=+\infty$ (or, equivalently, $n_g=+\infty$) produces an unbounded sequence of interaction values.

To illustrate in practice this technique of definition of the network-specific interaction map, let us assign some actual values to the parameters and coefficients just introduced. Choosing a minimum resistance value of 1Ω and a maximum resistance value of 1 MΩ, we obtain $g_{min}=10^{-6}$S and $g_{max}=1$S. The range of conductance values spans six decades. Setting the number of values per decade to $n_d=8$ we obtain $n_g=6n_d+1=49$ and $\alpha=10^{1/8}\approx 1.33$. If we choose for example a value of $i_{min}=20$, we obtain the actual network-specific interaction map $$i \xrightarrow{N(i)} g$$

illustrated in the table below.

| | | |
|---|---|---|
| $i < i_{min} = 20$ | → | $g = g_0 = 0$ (no connection) |
| $i = 20$ | → | $g = g_{min} = 10^{-6}$ S |
| $i = 21$ | → | $g = \alpha g_{min} \approx 1.33 \times 10^{-6}$ S |
| $i = 22$ | → | $g = \alpha^2 g_{min} \approx 1.78 \times 10^{-6}$ S |
| ... | | ... |
| $i_{max} = i_{min} + n_g - 1 = 20 + 49 - 1 = 68$ | → | $g = g_{max} = 1$ S |
| $i > i_{max} = 68$ | → | $g = g_\infty = \infty$ (direct connection) |

If the circuit to be synthesized must be realized with discrete components, it is advisable to use directly the elements of one of the standard resistor series—for example the E12 series mentioned above—rather than analytically defined logarithmically distributed values. In that case, $g_{max}$ would correspond to the minimum resistance value of the series, $g_{min}$ would correspond to its maximum resistance value, $n_g$ would be the number of elements in the series, and the device interaction map would associate values of sequence interaction strength from $i_{min}$ to $i_{max}$ with the resistance (conductance) values of the standard series.

Now that the details and requirements of the network-specific interaction map have been analyzed, we can go back to the definition of the details of the generic sequence interaction map $L(s_1, s_2)$. To actually implement the generic sequence interaction map in terms of local alignment of sequences we must assign the genetic alphabet and the scores that are required for the computation of the local alignment over that alphabet. This means assigning the substitution scores $c_{x \to y}$, the insertion scores $c_{\to y}$, and the deletion scores $c_{x \to \_}$ for all characters x and y belonging to the genetic alphabet. The scores are grouped into a substitution matrix, an insertion vector, and a deletion vector, which, together, form the scoring matrices.

The choice of the scoring matrices is a central problem of parameter assignment for an evolutionary system that uses the alignment of sequences to implement the device interaction map. In a sense, the scoring matrices implicitly define the "physics" of the interaction between the portions of the genome. To solve this parameter assignment problem, we can start by listing some conditions that the scores preferably satisfy according to a preferred embodiment of the invention.

First, although the scores can be real numbers, there is no loss of generality in considering them integers, since at the level of the generic sequence interaction map we are concerned only with the ordering of the interactions and not to the actual value of these interactions. It is the role of the network-specific interaction map to transform these ordered elements into actual values of interaction strength.

Second, some non negative scores are preferably present in the scoring matrices. Otherwise, the local alignment algorithm which returns the highest possible alignment score will always return two empty matching regions and a null alignment score.

Third, not all entries of the scoring matrices are positive, otherwise the alignment algorithm will tend to put in correspondence all the characters of the two strings in order to have a higher score instead of ignoring some characters at the start or end of the sequences, and the alignment would therefore tend to be global rather than local. Preferably, there are some pairs of characters that are considered exact or close matches and assigned a positive substitution score, and all other pairs are considered mismatches and attributed a negative substitution score. Insertion and deletion are preferably also assigned a negative score.

Fourth, the condition $c_{x \to y} \leq c_{x \to \_} + c_{\_ \to y}$ is preferably observed, otherwise the substitution $x \to y$ will never appear in an optimal alignment, as the pair formed by the deletion of x and the insertion of y achieves a higher score than the direct substitution of x with y.

Fifth, since the pair of sequences that must be aligned is assumed as unordered, the symmetry conditions $c_{x \to y} = c_{y \to x}$ and $c_{\_ \to y} = c_{y \to \_}$ are preferably respected by the substitution, insertion, and deletion scores. This means that the substitution matrix is preferably symmetric and that the insertion vector and the deletion vector coalesce into a unique indel vector of indel scores.

Figures 16, 17:
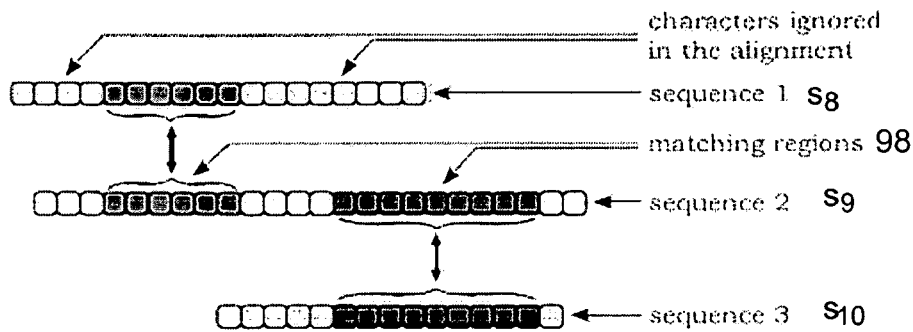
FIG. 16 illustrates an example of a local alignment of three sequences of characters.
FIG. 17 shows an example of a substitution matrix and of an indel vector according to an embodiment of the invention.

FIG. 17 shows an example of scoring matrices 9 according to a preferred embodiment of the invention, satisfying all these requirements. Note that besides the conditions given above, the substitution matrix 91 shown in FIG. 17 is also circulant, that is, its rows are cyclically shifted versions of each other. Moreover, in FIG. 17 the indel score is the same for all characters. Both choices, although not indispensable, simplify the implementation of the alignment algorithm. All the scoring matrices considered in this description will preferably have both these characteristics and, therefore, only the first row of the substitution matrix 91 and the first element of the indel vector 92 will be explicitly shown from now on.

The list of requirements given above puts a series of constraints on the structure of the scoring matrices, but does not determine the size of the genetic alphabet and/or the actual entries of the scoring matrices. To proceed further in the parameter assignment we thus need to consider what we positively want to obtain from our sequence alignment. This, in turn, derives from the requirements specified by the network-specific interaction map analyzed above. A requirement is the possibility for the local alignments score to exceed a maximum value $i_{max}$ corresponding to the maximum network-specific interaction strength. At the same time we want to avoid the necessity of dealing with extremely long sequences in order to generate values of alignment score in the $i_{max}$ range, since that would require long genomes and long computation times for the alignment algorithm. These two requirements can be met ensuring that some of the substitution scores have large enough positive values. These large positive values, however, would tend to favour the indiscriminate production of "global-like" alignments with high alignment scores. To avoid an excessive interference between sequences and to keep local the alignment we must thus balance the positive score values with negative values.

Preferably, a negative average score for the elements of the scoring matrices is ensured. This is achievable for example, even in presence of high positive scores, if the size of the genetic alphabet is large, as this ensures the existence of many pairs of characters that can be considered mismatches and to which a negative substitution score can be attributed. The increase of the size of the genetic alphabet has also the beneficial effect of increasing the redundancy of the device interaction map. On the other hand, a larger alphabet enlarges the search space and slows the sequence alignment algorithms, although the additional redundancy can compensate for this.

Finally, the entries of the scoring matrices preferably permit the production of all the possible values of alignment score up to $i_{max}$, in order to permit the production of all the values of interaction strength belonging to the range of the network-specific interaction map. This means that there are preferably scores of various magnitude in the scoring matrices which, when combined, are able to produce all values of sequence interaction strength composing the domain of the network-specific interaction map.

Figures 18, 19, 20:
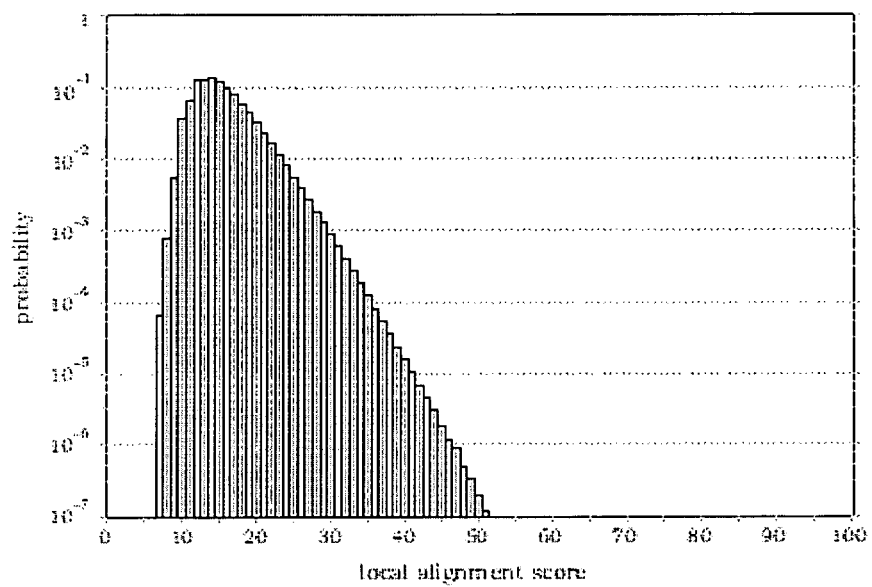
FIG. 18 shows another example of a substitution matrix and of an indel vector.
FIG. 19 shows still another example of a substitution matrix and of an indel vector.
FIG. 20 shows an estimate of the probability distribution of the local alignment score of pairs of randomly generated sequences of length 40 built on an alphabet with size |G|=26, using the scoring matrices shown in FIG. 17.

The scoring matrices 9 shown in FIG. 17 comply for example with the above requirements, with large positive scores up to 5, an alphabet of 26 characters that permits the balancing of the positive scores with many negative scores, and a gradual transition from positive to negative substitution scores. FIG. 18 and FIG. 19 show two sets of scoring matrices 9', 9" still complying with the above mentioned requirements but with a smoother transition from positive to negative values in the substitution matrix relatively to the case shown in FIG. 17, and with progressively smaller magnitude of the maximum substitution score.

It was shown above that the value of $i_{max}$ follows as a consequence of the number $n_s$ of interaction strength values that have to be represented, and of the value $i_{min}$ defining the limit of the dead-zone of sequence interaction values associated with the absence of direct interaction. The need for this dead-zone stems from the fact that pairs of randomly generated sequences will tend to have a non-null local alignment score. It can be convenient to have most of these random alignment scores fall within the dead-zone, in order to minimize their interference with the alignments determined by the evolutionary process in its effort to functionally structure the evolving network. On the other hand, it is also desirable to have some overlap between the range of alignment scores that can be generated randomly with non negligible probability, and the range of alignment scores that are actually mapped to non null interaction strengths. In this way a range of weak interactions can be generated randomly with non negligible probability, thus facilitating the "probing" from the part of the evolutionary process, of the effect of the presence of the corresponding connections between the devices encoded in the genome.

Therefore, given a genetic alphabet size and a set of scoring matrices, the value of $i_{min}$ is thus preferably defined as the upper limit of the range of alignment scores that are generated with non negligible probability when aligning randomly generated pairs of sequences over the given genetic alphabet and using the given scoring matrices. The value corresponding to a "non negligible probability" depends on the estimate of the number of pairs of sequences associated with terminals in a typical evolving network. A value of probability between $10^{-2}$ and $10^{-3}$ can be considered reasonable for the examples reported in this description.

Preferably, the choice of the alphabet size and of the scoring matrices is an iterative process. Given the number $n_s$ of alignment score values required by the kind of network that must be evolved, we start by assigning tentative values to the alphabet size and to the scoring matrices. Then, we determine the probability distribution of the alignment scores of pairs of randomly generated sequences. We use this probability distribution to assign $i_{min}$ so as to obtain the slight overlapping of the range of the $n_s$ active alignment scores with the range of random scores. The local alignment score that can be expected from two random sequences depends however on the length of the sequences. Hence we preferably estimate the length of the typical sequence associated with a terminal of an evolving network. This estimate depends on the kind of network that must be evolved. A heuristic strategy for this estimation is for example to assign the number $n_t$ of terminals to which each terminal must be capable to independently connect through a wire (i.e., a connection with infinite conductance). This requires the possibility of generating $n_t$ independent alignment scores exceeding the $i_{max}$ limit, whereas $i>i_{max}$ is the range of alignment scores that is associated with the maximum strength connection. If $c_{max}$ is the maximum value existing in the scoring matrices, a sequence capable of generating these $n_t$ independent alignment scores has a minimum length l equal to $n_t \cdot i_{max}/c_{max}$. Since $i_{max}$ follows from the relation $i_{max}=i_{min}+n_s-1$, which requires the knowledge of $i_{min}$, we assume an initial value for our first iteration of $i_{min}=0$, from which we obtain an initial estimate of $i_{max}$ and of l. This value of l is used to generate the distribution of probability of the alignment score of randomly generated sequences, from which an improved estimate of $i_{min}$ is obtained and reinserted in the computation loop, until a stable estimate of $i_{min}$ and, therefore, of $i_{max}$ is obtained. This value of $i_{max}$ determines the minimum length $i_{max}/c_{max}$ of a sequence that can produce an alignment score corresponding to a connection with maximum strength. If this length is not excessive for the implementation, in particular for the computation time of the alignment scores and the size of the resulting genome, the alphabet length, scoring matrices, and the value of $i_{min}$ obtained can be used in the evolutionary experiments, otherwise the tentative values of the alphabet size and of the scoring matrices are corrected and the computation is restarted.

In practice, once the tentative alphabet size and scoring matrices are assigned, the first iteration of this cycle often gives already a good idea of the suitability of the choice. An issue is then the generation of the probability distribution of the alignment scores for pairs of randomly generated sequences, since the analytical determination of this distribution given the alphabet size and scoring matrices is still an open problem. The distribution is usually not Gaussian and belongs instead to the class of the so-called extreme value distributions, which are asymmetric and have a long tail in the high score range. Within the frame of the invention, it is usually sufficient to estimate the form of these distribution by generating sets of random sequences.

As an example of application of this approach in the context of the evolution of analog electronic circuits, let us consider as our tentative choice the scoring matrices 9 shown in FIG. 17 with an alphabet size $|G|=26$. The maximum substitution score in this case is $c_{max}=5$. The arguments and examples above have shown that a value of $n_s \approx 100$ is typically sufficient to span several decades of interaction strength. Let us assume also that number of terminals to which each terminal must be capable to connect independently through a wire is $n_t=2$. We thus obtain a first iteration value of typical sequence length of $l=n_t \cdot n_s/c_{max}=40$ characters.

FIG. 20 shows an estimate of the probability distribution of the values of local alignment scores of randomly generated pairs of sequences of length 40 built on an alphabet with size $|G|=26$ using the scoring matrices 9 shown in FIG. 17. Assuming a value of probability density of about $10^{-3}$ as the upper limit of the range of random scores, we obtain a first iteration value of $i_{min} \approx 30$, which gives a value of $i_{max} \approx 130$, and a length $i_{max}/c_{max} \approx 26$ for a sequence that can produce an alignment score corresponding to a connection with maximum strength.

Figure 21:
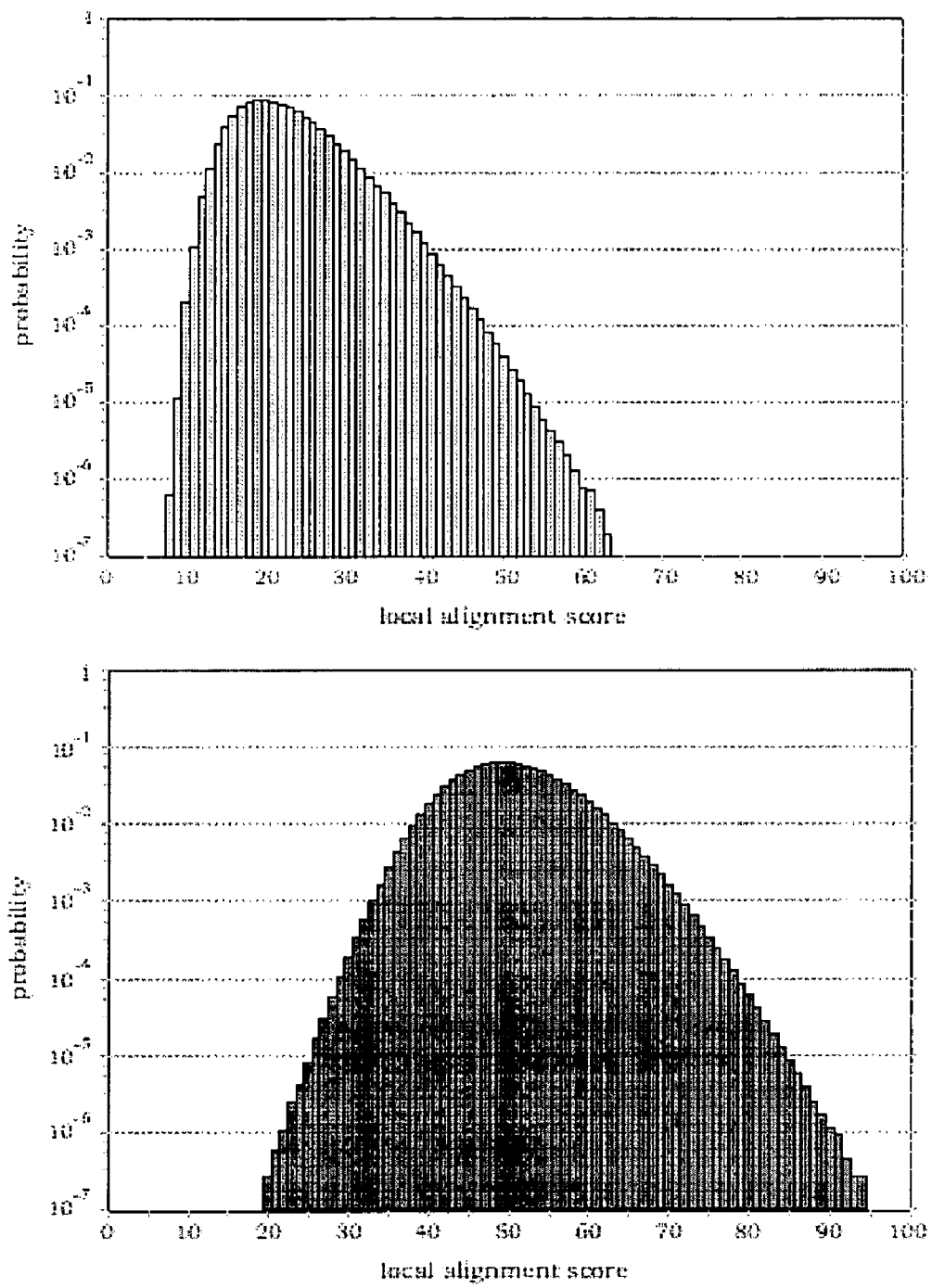
FIG. 21 shows an estimate of the probability distribution of the local alignment score of pairs of randomly generated sequences of length 40 built on an alphabet with size |G|=20 (top) and |G|=12 (bottom) using scoring matrices with the structure shown in FIG. 17.

Using for example a dynamic programming algorithm, the local alignment score of pairs of sequences having lengths in this range can be computed in reasonable time on present day computing machines. Moreover, the memory occupation of a genome with some thousand sequences in this range of length appears also reasonable. Hence, this choice of alphabet with size $|G|=26$ using the scoring matrices appears acceptable. FIG. 21 (top) shows the probability distribution obtained with the same structure of scoring matrix, but reducing the alphabet size to $|G|=20$. Comparing this distribution with that relative to $|G|=26$ shown in FIG. 20 reveals that the first iteration estimate of $i_{min}$ has increased from $i_{min} \approx 30$ to $i_{min} \approx 40$, which corresponds to an increase of $i_{max}/c_{max}$ from about 26 to about 28 characters. This slight increase appears acceptable in terms of resulting memory and computation time. FIG. 21 (bottom) shows the probability distribution obtained by reducing the alphabet size still further to $|G|=12$. With this reduction of alphabet size the average of the entries of the scoring matrices is only slightly negative. Now the first iteration estimate of $i_{min}$ has increased to $i_{min} \approx 70$. This means that now the effects of random alignments "waste" the equivalent of about 14 matching characters, with a value of $i_{max}/c_{max}$ increased to about 34. This makes this choice of alphabet size less appealing than the previous ones. Moreover, with this large value of the first iteration estimate of $i_{min}$, further iterations are advisable to obtain a better estimate of $i_{min}$ and $i_{max}$.

Figure 22:
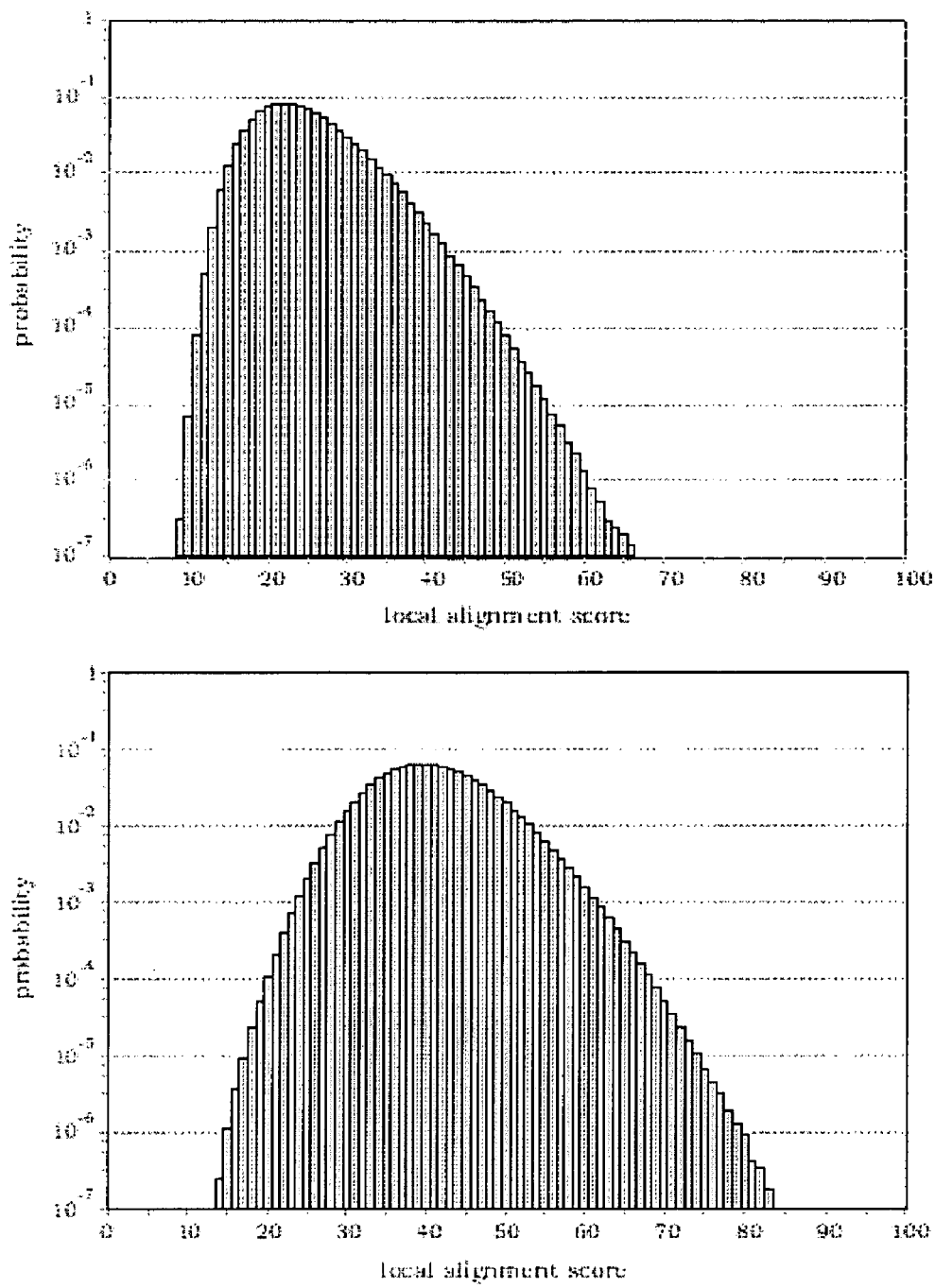
FIG. 22 shows an estimate of the probability distribution of the local alignment score of pairs of randomly generated sequences of length 50 built on an alphabet with size |G|=26 (top) and |G|=20 (bottom) using scoring matrices with the structure shown in FIG. 18.

FIG. 22 shows the probability distributions relative to the choice of the scoring matrices 9' illustrated in FIG. 18. Now the maximum substitution score is $c_{max}=4$, which leads to an increase to 50 characters of the estimated typical sequence length for $n_t=2$. The case $|G|=26$ (top) appears still acceptable, but with $|G|=20$ (bottom) the range of random alignment scores extends above 60 characters, which makes this choice of scoring matrices less suited to small alphabets.

Figure 23:
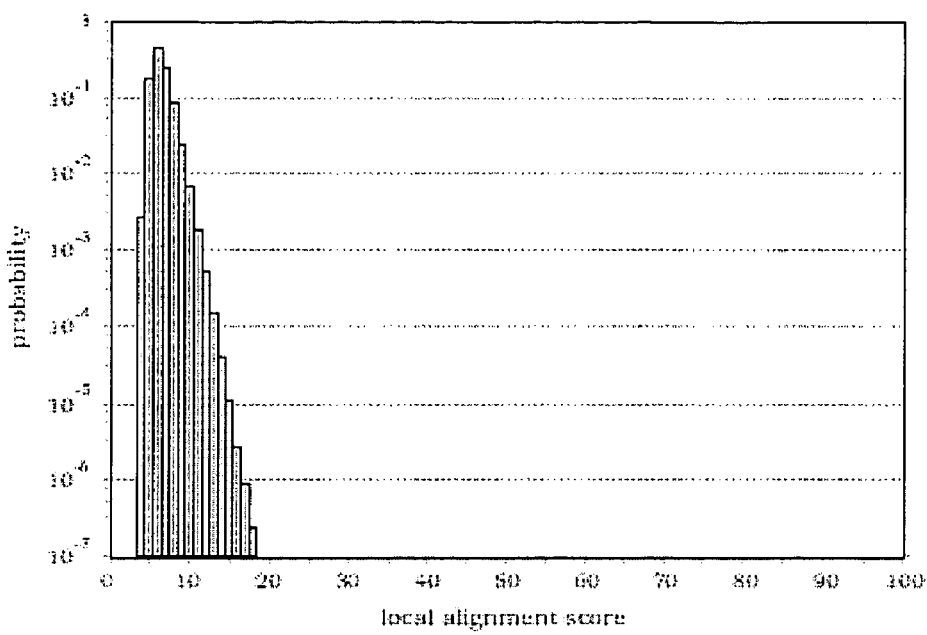
FIG. 23 shows an estimate of the probability distribution of the local alignment score of pairs of randomly generated sequences of length 100 built on an alphabet with size |G|=26 using scoring matrices with the structure shown in FIG. 19.

FIG. 23 shows the probability distributions relative to the choice of the scoring matrices 9" illustrated in FIG. 19 and to an alphabet size $|G|=26$. The maximum substitution score has further reduced to $c_{max}=2$, which leads to an increase to 100 characters of the first iteration estimate of the typical sequence length for $n_t=2$. Thanks to the absence of large positive substitution scores, and to the balancing of the existing positive scores with many negative ones, the random alignment score region is limited to slightly more than 10 characters. This small value is partially compensated by the effect of the small value of $c_{max}$, which gives a value of $i_{max}/c_{max}$ of about 55 characters.

Summing up, the analysis conducted above and the examples presented suggest the choice of a genetic alphabet size preferably greater than about 20, and the adoption of a set of scoring matrices following preferably the pattern of those shown in FIG. 17 and in FIG. 18, with a sufficiently large maximum positive substitution score and a sufficiently negative average of the entries of the scoring matrices. The exploratory experiments performed with the evolutionary system suggest in any case that the behaviour of the evolutionary experiments is not too sensitive to the choice of the alphabet size and of the scoring matrices, provided the general guidelines given above are followed. The number and figures above are given as illustrative implementation examples of the invention. The one skilled in the art will understand that other numbers can be chosen within the frame of the invention.

As explained before, the method of the invention for the genetic representation of networks uses pairs of character sequences to determine the interaction between the devices. When the sequence interaction is implemented using the local alignment technique explained above, the judicious choice of the genetic alphabet and of the scoring matrices in order to keep at bay the effect of random interactions is a first tactic against the excessive increase of interferences between sequences. However, above a certain level of complexity of the network, the number of devices, terminals, and associated sequences could overwhelm this kind of provision and could, for example, frustrate the evolution of networks composed of a large number of weakly connected devices.

This issue can be addressed in several ways. According to an embodiment, for example, two device terminals are considered for connection only if the associated sequences comply with some specific condition. An example of this approach that corresponds to the compartmentalization of the network is described more in details further below. According to this embodiment, the assumption is that the default condition for a pair of terminals is the absence of connection, and that the presence in the sequences associated with the terminals of a common pattern defining the terminals as belonging to the same compartment is required for their being considered for connection.

According to another embodiment, the complementary approach is considered, that we call interaction silencing. This approach is based on the assumption that the default condition for a pair of terminals is the potential existence of an interaction, and that the presence in the sequences associated with the terminals of specific patterns has the effect of the silencing of the potential interaction.

Figure 24:
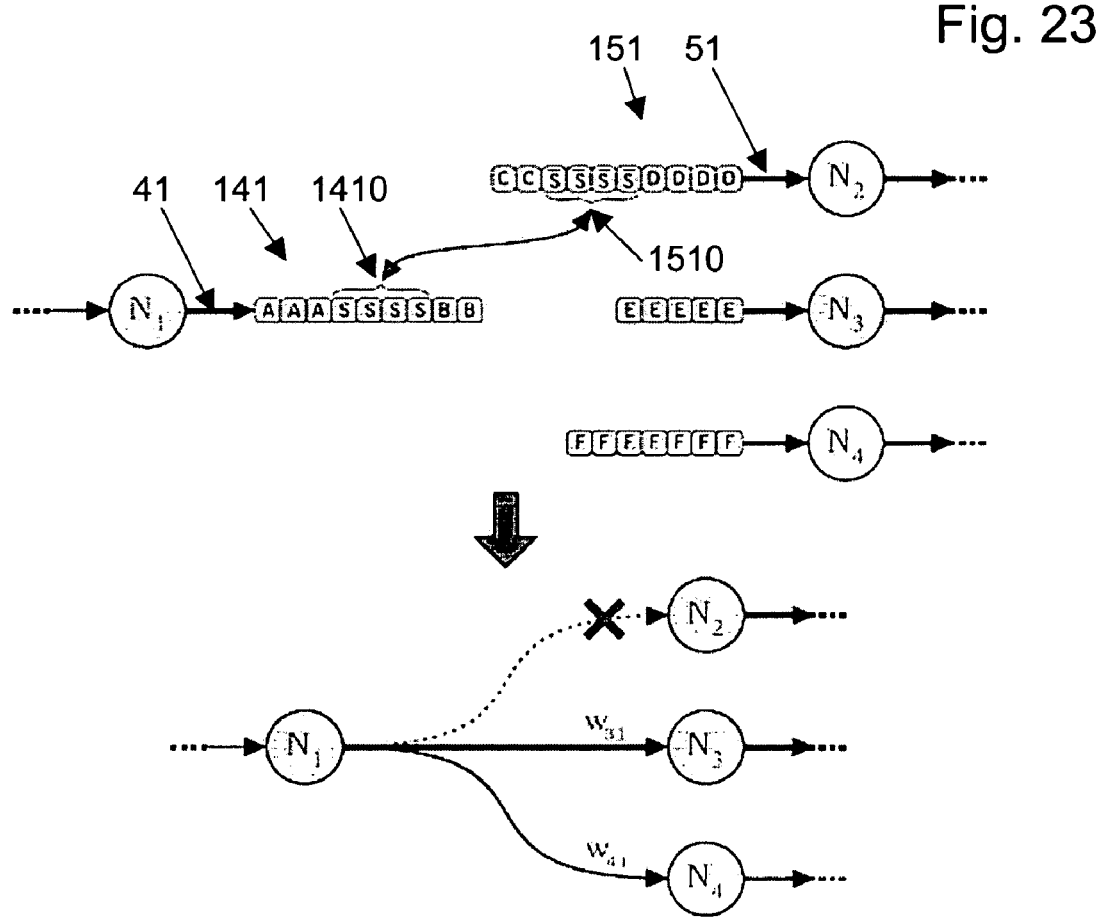
FIG. 24 shows interaction silencing by complementary exact matching of patterns in the sequences associated with the terminals whose interaction must be silenced.

A possible implementation of interaction silencing is illustrated in FIG. 24. For each letter of the genetic alphabet, a "complementary" character is defined, chosen between those that have a large negative substitution score relatively to that letter in the local sequence alignment scoring matrices. When the sequence 141 associated with a terminal 41 contains a substring 1410 of sufficient length that matches exactly the complementary substring 1510 in the sequence 151 associated with another terminal 51, the two terminals 41, 51 will not be considered for connection, irrespective of the value of interaction strength between the two sequences 141, 151. The minimal length of the matching substrings 1410, 1510 that determine the silencing of the interaction is preferably chosen according to the same criteria used to select the length of the tokens as described above, which ensure that randomly produced silencing is not too frequent. Typically, a minimal length of just a few characters will be sufficient to avoid an excessive amount of randomly generated silencing.

Note that the use for interaction silencing of the exact matching of substrings of complementary characters that are defined as badly matched relatively to the local alignment parameters, ensures that these substrings will not produce a positive value of interaction strength according to the sequence interaction map. Thus, the sequence interaction determined by the local alignment algorithm and the mechanism of interaction silencing just described can coexist with minimal reciprocal disturbance. Note that once again the local nature of the sequence alignment is instrumental in allowing the simultaneous presence of fragments of genome with independent roles in the determination of the network connectivity. The search for exactly matching complementary substrings entails a computational complexity that is linear in time relatively to the length of the sequences.

Thus, the computational complexity of the decoding of a genome where interaction silencing is widespread, is reduced relatively to the same genome where this mechanism is not implemented, since the sequence interaction map, whose computational complexity is quadratic relatively to the length of the sequences, need not be applied to pairs of sequences whose interaction has been silenced. To facilitate the evolutionary emergence of interaction silencing, a genetic operator of complemented chromosome fragment duplication is preferably defined, where a genome fragment is chosen at random, duplicated, and the duplicate is complemented and randomly inserted in the genome.

According to the examples given above, the sequence interaction map is a many-to-one map, and allows a preferably gradual transition from the absence of interaction to the maximum magnitude of interaction strength. The interaction silencing and the evolvable compartmentalization described below, on the other hand, is based on an on-off threshold mechanism that does not require any graduality. For this reason, the two functionalities can be implemented with different techniques, such as local sequence alignment for the first one and exact string matching for the second one. Preferably, the genetic alphabet used with local sequence alignment is not too small, to avoid the excessive presence of high-valued random interactions. On the other hand, for exact string matching this condition is of much less concern, since—like in the case of the tokens—the probability of randomly generating a string that matches exactly a given string of length $|t|$ with an alphabet of size $|G|$ is $|G|^{-|t|}$. This value can be easily reduced to negligible values by sufficiently increasing $|t|$, even with small genetic alphabets.

It is thus possible within the frame of the invention, to use a small genetic alphabet $|G|$, and implement interaction silencing and/or evolvable compartmentalization in terms of exact matching between possibly complementary sequences of nucleotides. In order to obtain a larger alphabet for the implementation of device interaction, n-tuples of nucleotides could be univocally associated with the elements of a larger interaction alphabet $|A|$. The interaction map would be thus defined between pairs of sequences of n-tuples of nucleotides, interpreted as sequences from this larger alphabet.

External Connections

According to a preferred embodiment of the invention, the sequence-based interaction map is not only used to determine the connections within the system, but also to define the connections crossing the boundary of the network, in particular to define the connections to its I/O ports.

The basic idea for the establishment of the connections of an evolving network with its environment is that the environment of an evolving network is still a network, and is therefore constituted by devices possessing terminals, some of which may be connected to the evolving network. Thus, in order to use a sequence-based device interaction map for establishing the connections, sequences are preferably associated with the terminals of the external devices that might possibly be connected to the network. The external devices can be any device appropriate to be connected to the network. For example, the external devices for an electronic circuit can be a power supply and/or a resistive load, while the external devices for an artificial neural network controlling a robot are typically, but not exclusively, sensors and actuators of the robot.

Note that not all terminals of the devices composing the external network must necessarily be given the possibility to connect to the evolving network. For example, the power supply of an electronic circuit or the sensing circuitry of a robot can be complex networks, with only a small subset of all the terminals of these networks considered as outputs that can possibly be connected to the powered electronic circuit or to the control system of the robot. On the other hand, the possibility for the evolving network to connect to some predetermined terminals of the external network is preferably not to be interpreted as a coercion to connect to all these terminals. Evolution is instead preferably left free to select which of those predetermined terminals are actually connected to the evolving network. This corresponds to leaving the possibility that a kind of elementary "feature selection" is performed on the raw collection of terminals available for connection. This possibility directly follows from the nature of the sequence-based mechanism of establishment of the connections between terminals according to the invention, since the evolved interaction strengths include values corresponding to the absence of any direct connection between two terminals. In order to connect the evolving network to the external network according to a preferred embodiment of the invention, a strategy is thus defined for associating sequences of characters with the terminals of the external network which are potentially connectible to the evolving network. As illustrated below by way of example, this can be done in different ways.

Figure 25:
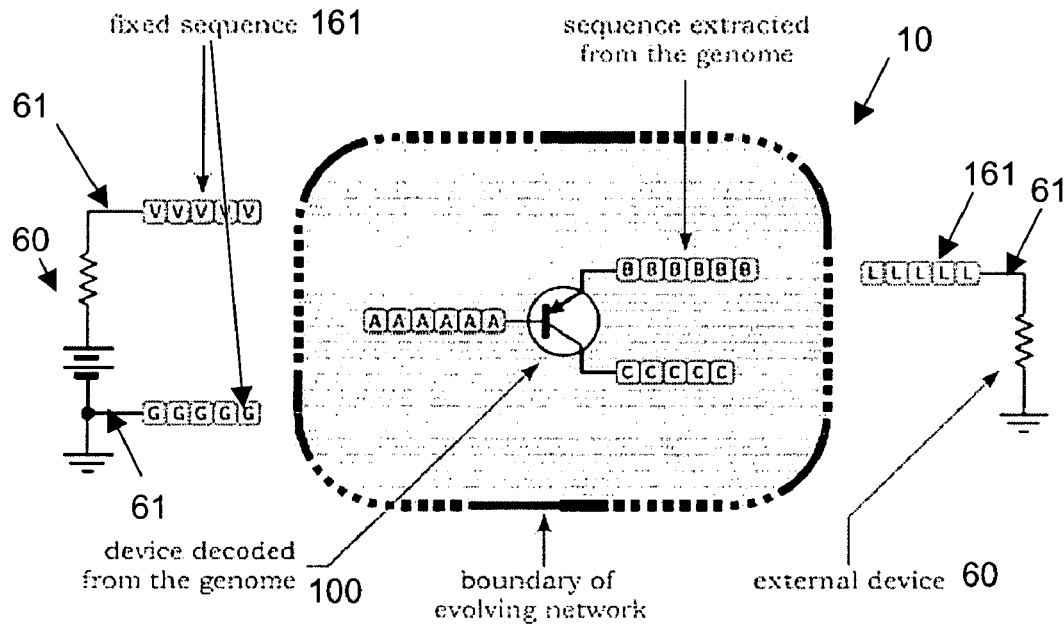
FIG. 25 illustrates how the evolution of connections between a preassigned external network and an evolving network can be obtained by associating a fixed sequence of characters with the terminals of the external devices.

In an embodiment of the invention illustrated in FIG. 25, a sequence of characters 161 is associated with each external device terminal 61 that must be given the possibility of connecting to the evolving network 10. A collection of predefined fixed sequences 161 is defined and associated with the connectible terminals 61. Once the fixed sequences 161 are associated with the connectible terminals 61 of the external devices 60, the connection strategy for the devices 100 decoded from the genome which is based on the use of a device interaction map can be applied also to the external devices 60, and the evolution of these connections is possible.

Although very simple, this approach has the disadvantage of enlarging the collection of parameters that must be assigned. Moreover, it requires a certain caution in the choice of the sequences 161. For example, it is preferably ensured that the structure of the fixed sequences 161 permits the establishment of a connection with infinite conductance towards the external components 60, should this connection be required to achieve the desired functionality of the whole network. This means that the fixed sequences 161 then ensure the possibility of exceeding the value of sequence alignment score that is associated with the maximum finite interaction strength value by the network specific interaction map. As explained further above, this possibility depends, among other things, on the choice of the scoring matrices, and requires an adequate length of the sequences involved, knowing that, as explained before, if the maximum substitution score is $c_{max}$, the maximum alignment score that can be realized by a sequence of length l is $c_{max} \cdot l$. The choice of appropriate fixed sequences 161 can thus be a complicated task, which opens the door to the suspicion that a possible failure of the evolutionary process is due to a poor choice of the fixed sequences associated with the external components.

Another drawback of the attribution of fixed sequences of characters 161 to some terminals 61 of the external devices 60 described is that each sequence must be capable of generating all the interactions required by the evolved network in order to display the expected functionality. These interactions can be manifold for some of the external connected terminals. For example, when a power supply is connected to an electronic circuit, its terminals are typically connected to many of the devices that form the circuit. It is thus difficult to anticipate the number of connections that each external terminal 61 needs to establish, and to design the associated sequences 161 accordingly. This difficulty, however, is not as great as it might seem, since evolution can overcome it by establishing a connection between the external terminal and a terminal of a device belonging to the evolving circuit, and then use the terminals of that device to extend the connection to the rest of the evolving circuit.

Figure 26:
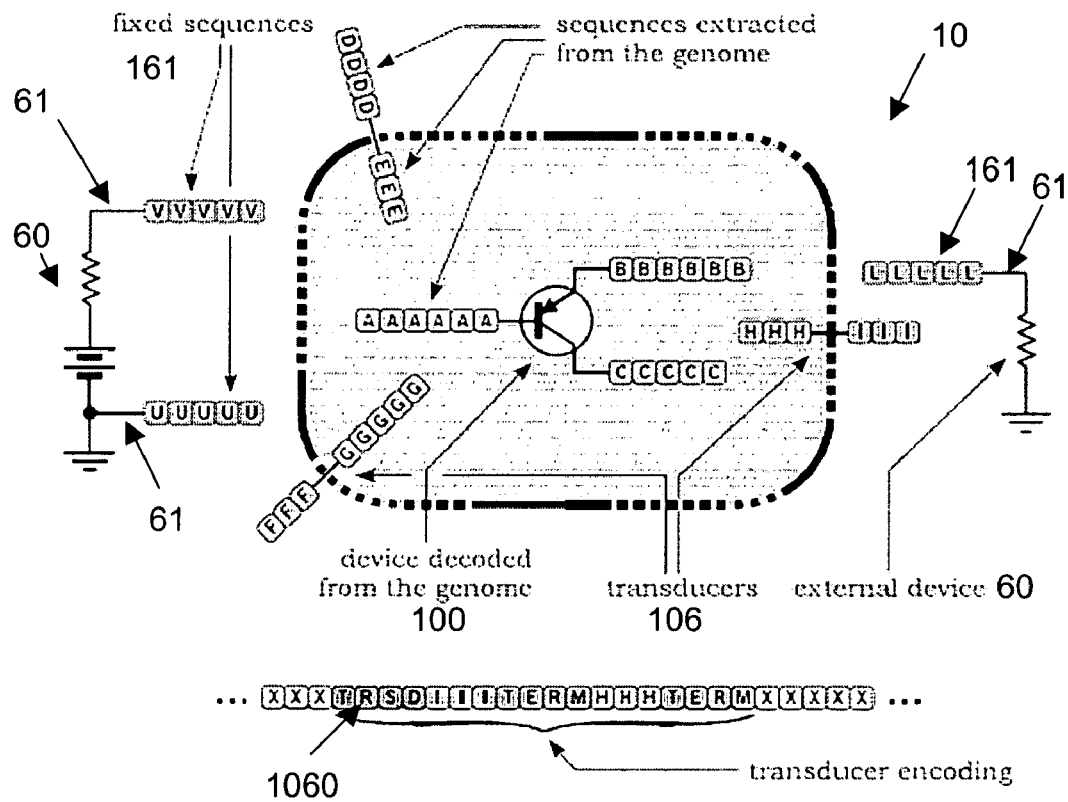
FIG. 26 illustrates how the evolution of connections between preassigned devices of an external network, and those of an evolving network are facilitated by defining transducer devices.

In a preferred embodiment of the invention illustrated in FIG. 26, this kind of evolved "device bridging" function is facilitated by defining a special transducer device, or transducer 106, whose explicit role is the establishment of a connection linking the external world to the evolved system 10. As for the other devices 100 of the network 10, the transducer 106 is identified in the genome by a specific token 1060, and is characterized by one terminal that is considered as belonging to the external network, and one that is considered as belonging to the evolving network 10. The association of sequences of characters extracted from the genome proceeds exactly like for the other devices, including the possibility of associating more than one sequence of characters with one terminal. An advantage of explicitly defining this new kind of device is that by duplicating and mutating the representation of an existing transducer in the genome—which is done with the available genetic operators described further below—several independent connections can be easily established with an external device 60.

According to a variant embodiment, transducer devices can be used to evolve compartmentalized networks. For example, a simple way of obtaining a compartmentalized network is to assume each artificial chromosome as specifying a separated compartment of the network, the transducers encoded in these chromosomes being then used to establish connections between the compartments.

A variant embodiment which leaves more freedom to evolution in determining a compartmentalized network was anticipated in the context of the discussion on interaction silencing. According to this variant embodiment, device terminals are considered for connection only if the associated sequences comply with some specific condition, for example, the presence in the sequences associated with the terminals of a common pattern defining the terminals as belonging to the same compartment. This embodiment differs from that based on transducers in that the patterns that determine the compartments are preferably evolved rather than predefined like the transducer tokens.

Figure 27:
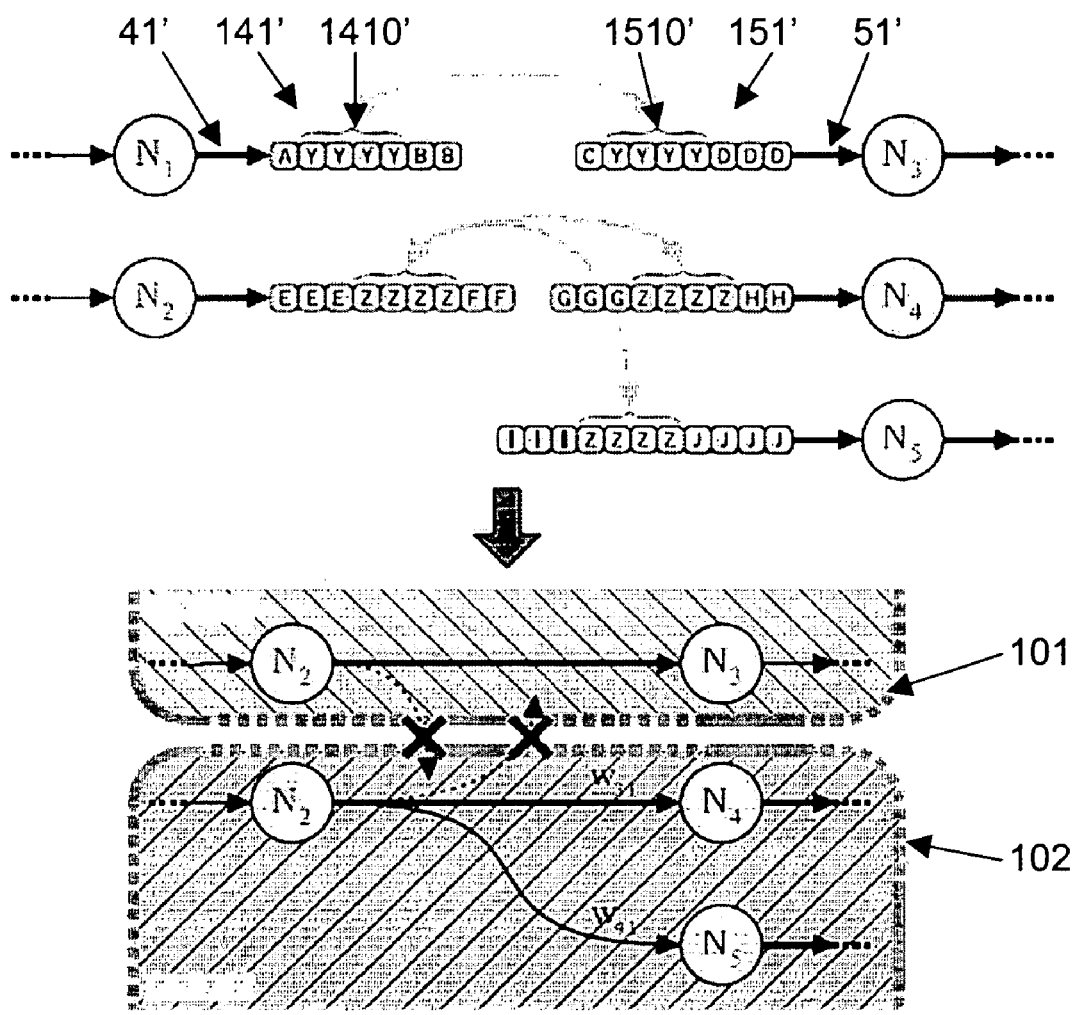
FIG. 27 illustrates a method of evolvable compartmentalization of a network.

FIG. 27 illustrates a possible implementation of this variant embodiment. The letters of a subset of the genetic alphabet are defined as having a large negative substitution score relatively to all the letters of the alphabet (including the letter itself) in the local sequence alignment scoring matrices. When the sequence 141' associated with a terminal 41' contains a substring 1410' of sufficient length composed of letters in this special subset and matching exactly a substring 1510' in the sequence 151' associated with another terminal 51', the two terminals 41' and 51' are considered as belonging to the same compartment 101. In this case, the sequence interaction determined by the local alignment score of the sequences 141' and 151' is calculated, otherwise the corresponding terminals are assumed as not directly connected. The interaction between two distinct compartments 101, 102 is brought about by devices that have terminals (either distinct or not) belonging to more than one compartment.

The use of the exact matching of substrings of characters that are defined as badly matched relatively to the local alignment parameters, ensures that these substrings will not produce a positive value of interaction strength according to the sequence interaction map. Thus, the sequence interaction determined by the local alignment algorithm and the mechanism of evolvable compartmentalization can coexist with minimal reciprocal disturbance. A variant of the exact substring matching algorithm described above which has linear computational complexity relatively to the length of the sequences is preferably used to check for the condition of membership of the same compartment before the sequence interaction mapping which has quadratic computational complexity is possibly applied to the sequence. The optional presence of a genetic operator of genome fragment duplication facilitates the evolutionary reorganization of the compartmentalized network structure.

The establishment of a connection between distinct compartments based on transducers requires the definition of fixed sequences associated with the connectible terminals of the external network. According to an embodiment of the invention, if the external network and the evolving network are the only existing compartments, the fixed sequences and the transducers are preferably coalesced into a unique device, called I/O port. The connectible terminal of the external device and the transducer terminal belonging to the external network are thus assumed as always being directly connected. Hence, only one of the transducer sequences remains and must be extracted from the genome, whereas the fixed sequence associated with the terminal of the external device disappears, and no longer needs to be defined.

Figure 28:
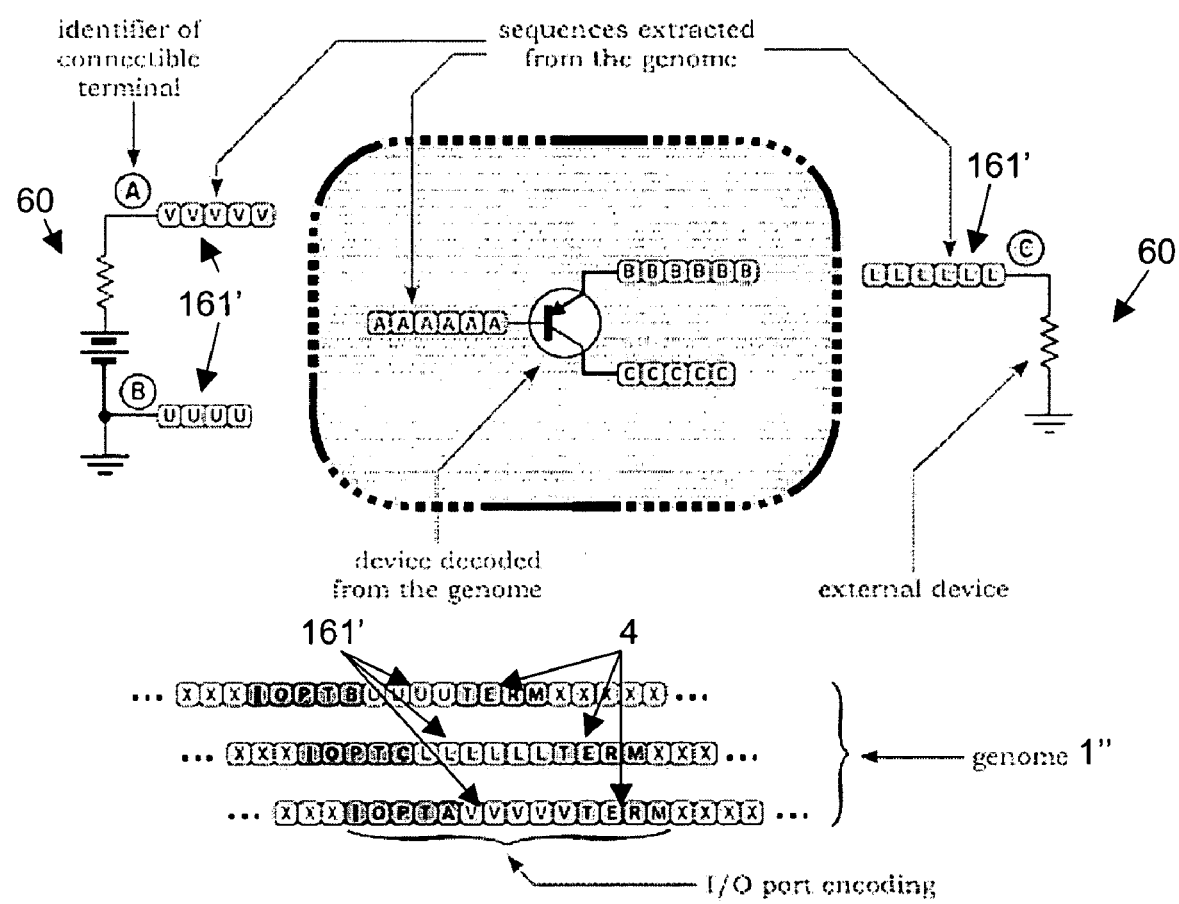
FIG. 28 illustrates an example of a method for the connection of external devices to an evolving network by means of I/O ports associated with external terminals marked as connectable to the evolving network.

According to this embodiment illustrated by way of example in FIG. 28, each external node that is assumed as connectible to the evolving circuit is preferably associated with a particular I/O Port device, and has a distinct device token. For example, the external circuit shown in FIG. 28 has three terminals A, B and C which are assumed as connectible, and three tokens IOPTA, IOPTB and IOPTC are thus defined. In the decoding of a genome 1" into a network, the fragments of genome, or sequences of characters 161' delimited by the I/O port tokens IOPTA, IOPTB and IOPTC and by the terminal tokens 4 are extracted and associated with the corresponding terminal A, B or C of the external devices 60. The terminals A, B, C are thus considered as devices belonging to the evolving network and the device interaction map is preferably applied to determine the strength of the interaction between all pairs of terminals that have a sequence of characters associated with them.

Genetic Operators

The genetic representation of networks according to the invention permits the execution of many kinds of reorganizations of the genome without compromising its decodability. Preferably, the only practical limit that is imposed on the genome relates to the length of the sequences associated with the terminals and with the parameters of the devices, in order to ensure that the sequence alignment algorithm that constitutes the core of the device interaction map remains executable in reasonable time and memory bounds. Apart from this limit, the fragments of the genome coding for components are preferably of variable length and located anywhere within the genome. The genome itself is thus preferably a variable length genome. This allows the use, in the evolutionary algorithms applied to the genetic representation according to the invention, of several genetic operations that are seldom used in artificial evolution experiments. In particular, the genetic representation of the invention allows

- Operations on single nucleotides, such as insertion, deletion, and substitution.
- Operations on chromosome fragments, such as duplication, duplication of complement, deletion, transposition, and insertion of device descriptors.
- Operations on chromosomes, such as duplication and deletion of single chromosomes, and crossover, or reciprocal recombination, of pairs of chromosomes.
- Operations on the whole genome, such as duplication and trimming.

From the point of view of the genetic operators, each chromosome is just a sequence of characters where the tokens for devices, terminals and parameters preferably have no special meaning. Therefore, the tokens are preferably not protected from the action of the genetic operators, whose action can invalidate any device descriptor present in the genome, making that particular descriptor undecodable.

Let us now consider one by one the genetic operators listed above.

- Nucleotide insertion: a random character belonging to the genetic alphabet is inserted, with probability $p_{ni}$, between each pair of adjacent nucleotides existing in the genome.
- Nucleotide deletion: each nucleotide in the genome is deleted with probability $p_{nd}$.
- Nucleotide substitution: each nucleotide in the genome is substituted, with probability $p_{ns}$, with a random character belonging to the genetic alphabet.
- Chromosome fragment duplication: for each chromosome, with probability $p_{f2}$, two random points are chosen and the intervening genome fragment is duplicated and the duplicate is inserted at a randomly chosen point of a randomly chosen chromosome belonging to the genome.
- Complemented chromosome fragment duplication: for each chromosome, with probability $p_{fc}$, two random points are chosen and the intervening genome fragment is duplicated; the duplicate is then complemented and inserted at a randomly chosen point of a randomly chosen chromosome belonging to the genome.
- Chromosome fragment transposition: for each chromosome, with probability $p_{ft}$, two random points are chosen and the intervening genome fragment is transferred at a randomly chosen point of a randomly chosen chromosome belonging to the genome.
- Chromosome fragment deletion: for each chromosome, with probability $p_{fd}$, two random points are chosen and the intervening genome fragment is deleted.
- Device insertion: for each chromosome, with probability $p_{di}$, the descriptor of a device randomly selected in the device set is inserted at a randomly chosen point. The sequences of characters associated with the terminals and the evolvable parameters of the devices can be randomly generated or can be obtained by sampling the sequences associated with the terminals of the devices existing in the genome.

Chromosome duplication: each chromosome is duplicated with probability $p_{c2}$. The duplication can either append to the chromosome a copy of itself, or create a new chromosome.

Chromosome deletion: each chromosome is deleted with probability $p_{cd}$.

Crossover, or reciprocal recombination: in the simplest implementation of the crossover operator, the genomes of two individuals, the "parents", are first compared. If the number of chromosomes in the two genomes is the same, the chromosomes are paired and, for each pair, with probability $p_{cx}$, one point is randomly chosen within each chromosome, and the fragments of chromosomes thus determined are swapped to generate the new chromosomes. The limit of this kind of crossover operator is that, when applied to chromosomes that—like those of the genome according to the invention—do not have a fixed structure and length, it tends to produce macro-mutations rather than the recombination of homologous chromosome fragments. It is therefore advisable to redefine the crossover operator so as to favour the recombination of fragments of chromosome that can be considered homologous. A possible candidate for this role of homologous crossover operator starts by choosing randomly one tentative crossover point within one of the chromosomes that must be recombined. A fragment of chromosome of a predefined length $l_m$ belonging to the neighbourhood of the selected point is then considered as a template and a fragment sufficiently similar to the template is searched in the other chromosome. The search for a fragment similar to the template can start with the search of a fragment exactly matching a substring of the template and then evaluating the global alignment score of the whole template with the tentative matching region thus identified. If a fragment sufficiently similar to the template is found, a crossover point in this second chromosome corresponding in the template to the tentative crossover point previously selected in the other chromosome is identified, and the fragments of chromosomes thus determined are swapped to generate the recombined chromosomes. Thus, the recombination is performed only in presence of a reasonable matching between the fragments of genome adjacent to the crossover point. Since the actual execution of the recombination requires the existence of a certain similarity between the paired chromosomes, this operation will preferably be seldom performed if the population gene pool is highly heterogeneous. However, the selection built in the evolutionary process tends to rapidly reduce the diversity of the population and to produce a degree of genetic homogeneity that permits the actual accomplishment of most of the attempted recombinations of chromosomes.

Genome duplication: the whole genome is duplicated with probability $p_{g2}$. The duplication can either append to each existing chromosome a copy of itself, or create a new chromosome for each existing one.

Genome trimming: the application of the genetic operators described so far can result in the transformation into non coding genome of fragments of genome previously coding for devices. The presence of this non coding genome does not prevent the decoding of the remaining genome, and can even conceivably play the role of an evolutionary useful repository of genetic fragments and pseudo-genes. However, in order to reduce periodically the genome length, it is also useful to be able to free the genome from most of the non coding genome. To this end, a genome trimming operator is defined, which eliminates from the genome of an individual all the non coding genome except possibly a short fragment of predefined or random length that is retained in order to space the device descriptors and leave in the genome some non-coding genome that can be possibly recruited by evolution. At each generation the genome trimming operator is applied to each individual with probability $p_{gt}$, and to all individuals with probability $p_{pt}$. Note that the procedure of genome decoding automatically identifies the coding regions of the genome, and this information can be used to implement the genome trimming operation with minimal additional computational effort.

The genetic operators listed above are given as illustrative examples of possible genetic operations that can be performed on a network represented according to the genetic representation of the invention. The one skilled in the art will understand that these operators can be combined and/or that further operators can be introduced in an evolutionary algorithm to be applied on the genetic representation of the invention.

Although not strictly a genetic operator, the generation of a population of individuals is an operation that is required to start the evolutionary process. A first possibility consist in randomly generating the genomes of the individuals of the initial population. This is for example obtained by performing one or more operations of device insertion on a background of random nucleotides. Another possibility consists in taking as starting point for the evolutionary process the genetic representation according to the invention of systems that were obtained with traditional design methodologies or as a result of a process of natural or artificial evolution. In this way the evolutionary design or reverse engineering process proceeds incrementally from the structure of the systems used in the initial population thus obtained.

In the description above, we have specified elements required to actually implement an evolutionary system for networks according to the invention. We have defined a genetic representation for the devices of a network which tolerates major reorganizations of the genome; we have defined a way to determine and evolve the connections between the devices of the network and between the evolved network and the external network and/or other evolved compartments and networks, which is based on an abstract definition of the interaction between fragments of genome; we have defined a set of genetic operators that can reorganize the genome and change the composition and the structure of the network, either gradually or abruptly. We have in particular specified a definite implementation of the interaction between fragments of the genome in terms of local sequence alignment. Note, however, that other implementations of this mapping could be conceived within the frame of this invention.

In the description above, the values of interaction strength characterizing the links between two terminals of the network as well as the parameter values determining the evolvable characteristics of the devices are scalar values. The one skilled in the art will however understand that other mappings are possible within the frame of the invention for the corresponding sequences of character which can deliver any other type of value, including for example vectors, etc.

In a preferred embodiment, the method of the invention is implemented on a computer system typically comprising a processor and some memory space. A program, stored on a possibly removable storage medium, is preferably loaded on the memory of said computer and run by said processing data for performing the steps of the method of the invention for the synthesis and/or reverse engineering of networks, as well as the application of the corresponding evolutionary algorithm to a population of networks in order to improve their overall performance and/or in order to add new functionalities to the said networks.

The invention claimed is:

1. A method of evolving a network using a genetic representation, said network comprising one or more devices, each of said devices comprising at least one terminal, said at least one terminal being connected to at least one other terminal by a link characterized by a value of interaction strength, at least one of said one or more devices having a parameter token, whereas the value associated with said parameter token determines a characteristic of said device, said method comprising the steps of:

associating with said at least one terminal a first sequence of characters;

associating with said at least one other terminal a second sequence of characters;

mapping at least part of said first sequence of characters and at least part of said second sequence of characters to said value of interaction strength in order to determine said value of interaction strength by calculating a distance between at least part of said first sequence of characters and at least part of said second sequence of characters and mapping said distance to said value of interaction strength;

associating with said parameter token a third sequence of characters;

mapping at least part of said third sequence of characters to the value of said parameter token;

creating a genetic representation from said first, second, and third sequence of characters;

applying genetic operators to said genetic representation; and using said genetic representation to generate an evolved network, for adapting said network, and/or to perform a computation or simulation with said network.

2. The method of claim 1, said step of mapping at least part of said third sequence of characters to the value of said parameter comprising the step of calculating a distance between at least part of said third sequence of characters and at least part of a fixed sequence of characters.

3. The method of claim 2, said step of mapping at least part of said third sequence of characters to the value of said parameter further comprising the step of mapping said distance to said value of said parameter.

4. The method of claim 1, said first sequence of characters being part of a genome representing said network, said genome being constituted of a sequence of characters belonging to a genetic alphabet, the presence of each of said devices being indicated by a device token and the presence of said first sequence of characters being indicated by a terminal token.

5. The method of claim 4, at least one of said one or more devices having a parameter, whereas the value of said parameter determines a characteristic of said device, a third sequence of characters associated with said parameter being part of said genome, the presence of said third sequence of characters being indicated by a parameter token.

6. The method of claim 1, further comprising the step of creating a set of devices defining the types of all devices possibly comprised in said network.

7. The method of claim 1, wherein said at least one other terminal is an external terminal belonging to a device external to said network.

8. The method of claim 7, wherein said second sequence of characters is a fixed sequence.

9. The method of claim 7, wherein said second sequence of characters is part of a genome representing said network, said genome being constituted of a sequence of characters belonging to a genetic alphabet.

10. The method of claim 9, wherein the presence of said external terminal is indicated in said genome by a device token and the presence of said second sequence of characters is indicated in said genome by a terminal token.

11. The method of claim 1, wherein said at least one other terminal is a first terminal of a transducer, said transducer further comprising a second terminal, said second sequence of characters being associated with said first terminal and a fourth sequence of characters being associated with said second terminal, said second terminal being connected by another link characterized by another value of interaction strength to an external terminal belonging to a device external to said network, a fifth sequence of characters being associated with said external terminal, said method further comprising the step of mapping at least part of said fourth sequence of characters and at least part of said fifth sequence of characters to said other value of interaction strength in order to determine said other value of interaction strength.

12. The method of claim 11, wherein said second sequence of characters and said fourth sequence of characters are part of a genome representing said network, said genome being constituted of a sequence of characters belonging to a genetic alphabet, and wherein said fifth sequence is a fixed sequence.

13. The method of claim 12, wherein the presence of said transducer is indicated in said genome by a device token and the presence of said second sequence of characters and the presence of said fourth sequence of characters are indicated in said genome by terminal tokens.

14. The method of claim 1, wherein said step of mapping at least part of said first sequence of characters and at least part of said second sequence of characters to said value of interaction strength returns a value of interaction strength corresponding to no interaction when said first sequence of characters includes a first pattern and said second sequence of characters includes a second pattern complementary to said first pattern.

15. The method of claim 1, wherein said step of mapping at least part of said first sequence of characters and at least part of said second sequence of characters to said value of interaction strength returns a value of interaction strength corresponding to no interaction when said first sequence of characters and said second sequence of characters do not both comprise a same pattern.

16. A computer storage medium comprising a computer program logic for enabling at least one processor in a computer system to process a network, said network comprising at least one device, said at least one device comprising at least one terminal, said at least one terminal being connected to at least one other terminal by a link characterized by a value of interaction strength, said at least one device having a parameter token, the value associated with said parameter token determining a characteristic of said device, said computer program logic performing the steps of:

associating with said at least one terminal a first sequence of characters;

associating with said at least one other terminal a second sequence of characters;

mapping at least part of said first sequence of characters and at least part of said second sequence of characters to said value of interaction strength in order to determine said value of interaction strength by calculating a distance between at least part of said first sequence of characters and at least part of said second sequence of characters and mapping said distance to said value of interaction strength;

associating with said parameter token a third sequence of characters;

mapping at least part of said third sequence of characters to the value of said parameter token;

creating a genetic representation from said first, second, and third sequence of characters;

applying genetic operators to said genetic representation; and using said genetic representation to generate an evolved network, for adapting said network, and/or to perform a computation or simulation with said network.

17. A method of evolving a network using a genetic representation, said network comprising one or more devices, each of said devices comprising at least one terminal, said at least one terminal being connected to at least one other terminal by a link characterized by a value of interaction strength, said method comprising the steps of:

associating with said at least one terminal a first sequence of characters;

associating with said at least one other terminal a second sequence of characters;

mapping at least part of said first sequence of characters and at least part of said second sequence of characters to said value of interaction strength in order to determine said value of interaction strength by calculating a distance between at least part of said first sequence of characters and at least part of said second sequence of characters and mapping said distance to said value of interaction strength;

creating a genetic representation from said first and second sequence of characters;

applying genetic operators to said genetic representation; and using said genetic representation to generate an evolved network, for adapting said network, and/or to perform a computation or simulation with said network;

wherein said mapping is completed by calculating a distance between at least part of said first sequence of characters and at least part of said second sequence of characters.

18. A method of evolving a network using a genetic representation, said network comprising one or more devices, each of said devices comprising at least one terminal, said at least one terminal being connected to at least one other terminal by a link characterized by a value of interaction strength, at least one of said one or more devices having a parameter, the value of said parameter determining a characteristic of said device, said method comprising the steps of:

associating with said at least one terminal a first sequence of characters;

associating with said at least one other terminal a second sequence of characters;

mapping at least part of said first sequence of characters and at least part of said second sequence of characters to said value of interaction strength in order to determine said value of interaction strength by calculating a distance between at least part of said first sequence of characters and at least part of said second sequence of characters and mapping said distance to said value of interaction strength;

associating with said parameter a third sequence of characters, mapping at least part of said third sequence of characters to the value of said parameter;

creating a genetic representation from said first, second, and third sequence of characters;

applying genetic operators to said genetic representation; and using said genetic representation to generate an evolved network, for adapting said network, and/or to perform a computation or simulation with said network;

wherein said mapping at least part of said third sequence of characters to the value of said parameter constitutes calculating a distance between at least part of said third sequence of characters and at least part of a fixed sequence of characters.

19. A method of evolving a network using a genetic representation, said network comprising one or more devices, each of said devices comprising at least one terminal, said at least one terminal being connected to at least one other terminal by a link characterized by a value of interaction strength, said method comprising the steps of:

associating with said at least one terminal a first sequence of characters;

associating with said at least one other terminal a second sequence of characters; and mapping at least part of said first sequence of characters and at least part of said second sequence of characters to said value of interaction strength in order to determine said value of interaction strength by calculating a distance between at least part of said first sequence of characters and at least part of said second sequence of characters and mapping said distance to said value of interaction strength;

creating a genetic representation from said first and second sequence of characters;

applying genetic operators to said genetic representation; and using said genetic representation to generate an evolved network, for adapting said network, and/or to perform a computation or simulation with said network;

wherein said step of mapping at least part of said first sequence of characters and at least pan of said second sequence of characters to said value of interaction strength returns a value of interaction strength corresponding to no interaction when said first sequence of characters includes a first pattern and said second sequence of characters includes a second pattern complementary to said first pattern.

* * * * *